US008909930B2

(12) United States Patent
Winslow et al.

(10) Patent No.: US 8,909,930 B2
(45) Date of Patent: Dec. 9, 2014

(54) EXTERNAL REFERENCE MONITOR

(71) Applicant: L-3 Communications Corporation, New York, NY (US)

(72) Inventors: Richard Norman Winslow, Wilmington, DE (US); Jerry Hutchison, Huntingdon Valley, PA (US); Robert Louis Coia, Jr., Lower Gwynedd, PA (US)

(73) Assignee: L-3 Communications Corporation, New York, NY (US)

( * ) Notice: Subject to any disclaimer, the term of this patent is extended or adjusted under 35 U.S.C. 154(b) by 161 days.

(21) Appl. No.: 13/665,144

(22) Filed: Oct. 31, 2012

(65) Prior Publication Data

US 2013/0111211 A1 May 2, 2013

Related U.S. Application Data

(60) Provisional application No. 61/553,415, filed on Oct. 31, 2011.

(51) Int. Cl.
*G06F 21/00* (2013.01)
*H04L 29/06* (2006.01)
*H04L 9/32* (2006.01)
*G06F 21/57* (2013.01)

(52) U.S. Cl.
CPC .......... *H04L 63/0853* (2013.01); *H04L 9/3234* (2013.01); *H04L 9/3271* (2013.01); *G06F 21/57* (2013.01); *G06F 2221/2103* (2013.01); *G06F 2221/2107* (2013.01)
USPC .......................................... 713/168; 713/171

(58) Field of Classification Search
None
See application file for complete search history.

(56) References Cited

U.S. PATENT DOCUMENTS

| 6,115,819 | A | 9/2000 | Anderson |
| 7,134,024 | B1* | 11/2006 | Binding et al. ............... 713/187 |
| 7,313,679 | B2 | 12/2007 | Ranganathan |
| 7,908,483 | B2 | 3/2011 | Iliev et al. |
| 2004/0123137 | A1* | 6/2004 | Yodaiken ...................... 713/200 |
| 2005/0038790 | A1 | 2/2005 | Wolthusen |
| 2010/0100964 | A1* | 4/2010 | Mahaffey et al. ............... 726/25 |
| 2011/0030040 | A1* | 2/2011 | Ronchi et al. ..................... 726/5 |
| 2012/0066509 | A1 | 3/2012 | Lapp et al. |
| 2012/0269346 | A1* | 10/2012 | Best et al. ..................... 380/270 |

OTHER PUBLICATIONS

"Detecting Kernel-level Rootkits using Data Structure Invariants." Arati Baliga, Vinod Ganapathy, Liviu Iftode. IEEE Transactions on Dependable and Secure Computing (TDSC); vol. 8, No. 5, pp. 670-684; Sep./Oct. 2011.

(Continued)

*Primary Examiner* — Gilberto Barron, Jr.
*Assistant Examiner* — Malcolm Cribbs
(74) *Attorney, Agent, or Firm* — Condo Roccia Koptiw LLP

(57) ABSTRACT

Methods and systems for increasing the security or trust associated with an untrusted device are provided. For example, a trusted hardware component may send a request to the untrusted device. The request may indicate one or more challenges to be performed by a secure application executing on the untrusted device. The trusted hardware component may determine an expected response to the one or more challenges. The expected response may be determined at the secure hardware component based on an expected configuration of the untrusted device. The trusted hardware component may receive a response to the request from the untrusted device. The trusted hardware component may determine a security status of the untrusted device based on the expected response and the received response.

21 Claims, 11 Drawing Sheets

(56) References Cited

OTHER PUBLICATIONS

"Automatic Inference and Enforcement of Kernel Data Structure Invariants." Arati Baliga, Vinod Ganapathy, Liviu Iftode. Proceedings of the 24th Annual Computer Security Applications Conference (ACSAC 2008); pp. 77-86; Anaheim, California; Dec. 8-12, 2008.
Baliga, Arati, Vinod Ganapathy, and Liviu Iftode. "Automatic Inference and Enforcement of Kernel Data Structure Invariants." Proceedings of the 24th Annual Computer Security Applications Conference. Annual Computer Security and Applications Conference, Anaheim, California. Dec. 2008. pp. 1-22.
"Rootkits on Smart Phones: Attacks, Implications and Opportunities." Jeffrey Bickford, Ryan O'Hare, Arati Baliga, Vinod Ganapathy, Liviu Iftode. Proceedings of the 11th International Workshop on Mobile Computing Systems and Applications (HotMobile 2010); pp. 49-54; Annapolis, Maryland; Feb. 22-23, 2010.

* cited by examiner

EXTERNAL REFERENCE MONITOR

CROSS REFERENCE TO RELATED APPLICATIONS

This application claims the benefit of Provisional U.S. Patent Application No. 61/553,415, filed Oct. 31, 2011, the contents of which are hereby incorporated by reference herein it its entirety.

BACKGROUND

Different types of data may have different levels of security associated with the data. Although some data may be freely available, other types of data may be highly confidential or sensitive, and higher levels of security may be utilized to protect the data. For example, data that is deemed secret or confidential may be prevented from being shared to certain users, devices, or networks in order to prevent unauthorized access, use, disclosure, modification, inspection, reproduction, and/or destruction.

Commercial off-the-shelf (COTS) hardware and software may be products that are freely available in a commercial marketplace and may generally be available for public consumption. COTS products often have the benefit of being low-cost and easily replaced. Additionally, COTS products are often upgradable in ways that often benefit consumers. However, in many instances, COTS products may lack certain security features that allow the product to be fully utilized or trusted. For example, COTS communication devices may be unable to achieve basic trust and robustness with software running on an untrusted platform. Thus, a traditional COTS communication device may be unable to perform certain functions that entail high levels of assurance or security.

SUMMARY

Methods and systems for increasing the security or trust associated with an untrusted device are disclosed. For example, a trusted hardware component may send a request to the untrusted device. The request may indicate one or more challenges to be performed by a secure application executing on the untrusted device. The trusted hardware component may determine an expected response to the one or more challenges. The expected response may be determined at the secure hardware component based on an expected configuration of the untrusted device. The trusted hardware component may receive a response to the request from the untrusted device. The trusted hardware component may determine a security status of the untrusted device based on the expected response and the received response. If the device is determined to be operating according to an expected configuration, the security status of the untrusted device may be determined to be secure. If the untrusted device is determined to be secure, then the trusted hardware component may allow the untrusted device to perform one or more functions. For example, the trusted hardware component may allow the untrusted device to execute a specified application, make a secure call, access specified resources (e.g., enterprise or network resources, local resources such as memory), communicate with a communication peer, access a given network, etc. If the untrusted device is not operating in accordance with the expected configuration, the secure hardware component may determine the status is unsecure, and may deny the untrusted device permission to perform the one or more functions and/or may indicate the unsecure status to the user.

Determining the security status of the untrusted device based on the expected response and the received response may include comparing the expected response to the received response to determine if the expected response is equivalent to the received response. On condition that the expected response is determined to not be equivalent to the received response, the trusted hardware component may determine that the untrusted device has been compromised. On condition that the expected response is determined to be equivalent to the received response, the trusted hardware component may determine that the untrusted device has not been compromised. The request may include a random number seed, and the one or more challenges may be a request to hash the random number with data included in a specified memory region. The trusted hardware component may display an indication of the security status on an output device comprised of trusted hardware. The one or more challenges may be associated with a time limit for receiving the response from the untrusted device. The trusted hardware component may determine that the untrusted device has been compromised on condition that the received response is not received within the time limit. The trusted hardware component may perform one or more security functions on behalf of the untrusted device at the secure hardware component. For example, the one or more security functions may include one or more of authentication, encryption, decryption, key storage, key management, and/or firewall maintenance.

A trusted hardware module may be configured to provide security and/or increase the level of trust associated with an untrusted device. For example, the trusted hardware module may include a communication interface configured to communicate with the untrusted device using a local communication protocol. The untrusted device may include a processor configured to implement one or more security functions. For example, the trusted hardware module may determine one or more challenges to be performed by the untrusted device. The challenge may include an input generated by the trusted hardware module in order to prevent spoofing. For example, the input may be seed to a hashing function, a random number, or some other input generated by the trusted hardware. The trusted hardware module may determine an expected response to the one or more challenges. The expected response may be determined based on an expected configuration of the untrusted device. The trusted hardware module may include an output interface configured to display an indication of the security status.

In an example, the trusted hardware module may be configured to authenticate one or more of the untrusted device or a user of the untrusted device. The trusted hardware module may be configured to authenticate a communication peer on behalf of one or more of the untrusted device or the user of the untrusted device. The trusted hardware module may be configured to receive data to be encrypted from the untrusted device, encrypt the data to form encrypted data, and send the encrypted data to the communication peer. The trusted hardware module may be configured to send the encrypted data to the communication peer via the untrusted device. The trusted hardware module may be configured to receive second encrypted data from the communication peer, decrypt the second encrypted data to form decrypted data, and send the decrypted data to the untrusted device.

Methods and systems for a communication device to perform a secure call using untrusted hardware are disclosed. For example, a communication device may receive a request to perform a secure call. The communication device may authenticate with a trusted hardware component. The communication device may suspend one or more applications being executed on the communication device during the secure call. The communication device may send an indication of the contents of a memory region corresponding to at least a portion of an unsuspended process executing on the communication device to the trusted hardware component. The communication device may cryptographically communicate with a communication peer using the trusted hardware component.

For example, suspending one or more applications being executed on the communication device during the secure call may include suspending execution of an operating system of the communication device above a kernel level. In an example, the unsuspended process executing on the communication device may correspond to the kernel, where the kernel may provide an interface between hardware components of the communication device and software components of the communication device. Cryptographically communicating with the communication peer using the trusted hardware component may include receiving a session key from the trusted hardware component after authenticating with the trusted hardware component, and performing one or more of encryption or decryption using the session key. The communication device may receive a challenge from the trusted hardware module. The challenge may include a random number and an indication of a memory region. The communication device may hash the random number with data corresponding to the memory region. The communication device may send an indication of the result of the hash of the random number and the data corresponding to the memory region to the trusted hardware module within a predetermined or specified time period. The secure call may be established with a legacy Type 1 device using Secure Communications Interoperability Protocol (SCIP).

Methods and systems are disclosed for a secure hardware component to indicate a security status of an untrusted device. For example, the secure hardware component may perform one or more security tests on an untrusted device. The secure hardware component may include a trusted input. The trusted input may be used to authenticate a user of the untrusted device. For example, the user may input a password or some other authentication parameter in order to authenticate himself to the secure hardware component using the trusted input. The secure hardware component may determine the security status of the untrusted device based on a response received from the untrusted device during the one or more security tests. The secure hardware component may display an indication of the security status on an output device, wherein the output is included in the secure hardware component. In an example, the secure hardware component may perform one or more security functions for the untrusted device at the secure hardware component, wherein the one or more security functions comprise one or more of authentication, encryption, decryption, key storage, key management, or firewall maintenance. The one or more security functions may be performed on condition that the secure hardware component determines that the untrusted device is operating in accordance with an expected configuration.

The trusted hardware component/module may be external reference monitor (XRM) and/or an enterprise reference monitor (ERM). The XRM and/or ERM may monitor the security status of the untrusted device. The XRM and/or ERM may enforce security rules and procedures at the untrusted device. The untrusted device may be a COTS communication device. For example, the untrusted communication device may be a COTS smartphone that may not be specifically designed for high security functions.

BRIEF DESCRIPTION OF THE DRAWINGS

The following detailed description may be best understood when taken in conjunction with the accompanying drawings, of which.

DETAILED DESCRIPTION

Figure 1:
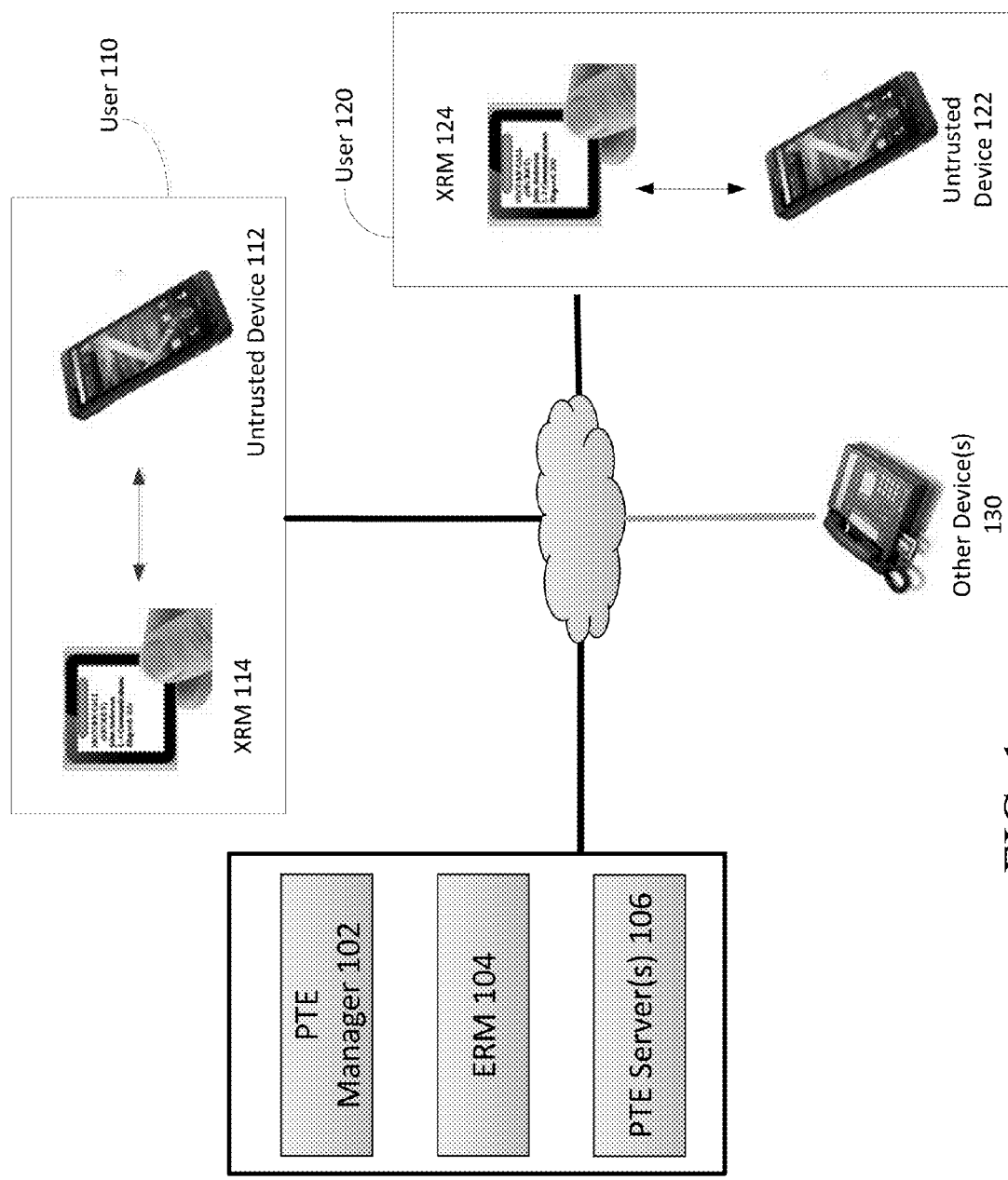
FIG. 1 illustrates an example Personal Trust Environment (PTE) architecture that includes both a local external reference monitor (XRM) and a remote enterprise reference monitor (ERM).

As the functionality associated with COTS communication devices (e.g., cell phones, smartphones, tablets, personal computers (PCs), laptops, workstations, etc.) continues to increase, the proliferation of these devices in the market has also dramatically increased. COTS devices often offer the benefits of providing state-of-the-art services and functionality, while also being easily upgradable and very user-friendly. However, many COTS devices are software-centric, and for certain applications software-based techniques for maintaining data security and integrity may be inadequate. For example, software-only applications may be unable to meet the National Security Agency (NSA) operational constraints for Secret or above (e.g., Top Secret) communications on COTS Smartphones and/or other client workstations. Due to the untrusted nature of the hardware contained in COTS devices, untrusted COTS platforms may be unable to attain the levels of assurance and reliability typically present for secure communication devices.

When used herein, the term COTS device may refer to any computing device capable of communicating over a network or performing processing tasks on behalf of a user. Although the examples described herein may be in terms of providing security or trust for a COTS smartphone or COTS workstation, the systems and methods disclosed herein may be equally applicable to any computing device or communication device for which additional security is desired. For example, the systems and methods disclosed herein may be applicable for providing additional security for cell phones, pagers, PCs, laptops, vehicles, kiosks, facilities, servers, workstations, tablets, smartphones, routers, modems, local area networks (LANs), processors, controllers, microcontrollers, and/or any other processing and/or communication device.

The term untrusted device may be used herein to refer to a device for which additional security and/or levels of trust may be desired. For example, an untrusted device may be a device that, although possessing some security and/or authentication functions/procedures, may utilize one or more of the systems or methods described herein in order to achieve additional security or trust. COTS devices (e.g., cell phones, pagers, PCs, laptops, vehicles, kiosks, facilities, servers, workstations, tablets, smartphones, routers, modems, LANs, processors, controllers, microcontrollers, and/or any other processing and/or communication device) may be examples of untrusted devices. In an example, a trusted hardware module may be configured to perform one or more tasks that may be difficult to perform in a secure manner on an untrusted device. For example, the hardware may be trusted because the device may have been manufactured in a controlled environment that ensures the hardware configuration is in accordance with the configuration that is expected by the user. A trusted hardware module may include one or more mechanisms to detect and/or prevent tampering.

In order to provide a desired level of security and/or trust for untrusted devices, a personal trust environment (PTE) may be established with the untrusted device. Establishing the PTE for the untrusted device may include one or more interactions with an external reference monitor (XRM) and/or enterprise reference monitor (ERM). The XRM and/or ERM may allow a user of the untrusted device to achieve an increased level of trust in the untrusted device and/or increase the level of security associated with the untrusted device. For example, the XRM and/or ERM may be implemented using trusted hardware components. Trusted hardware components may be hardware components for which recognized, secure manufacturing and distribution processes are known to be used such that the user may trust that the hardware is going to perform in accordance with an identified system design without fear of tampering.

Establishing a PTE for an untrusted device may impart a level of trust across one or more COTS devices that the user may rely on when determining whether the one or more COTS devices are trustworthy for a given task. The PTE may include a composite of one more of cyber security and awareness functions, identity management functions, and/or transactional security functions that may be provided by a trusted hardware device (e.g., an XRM and/or ERM). Example tasks that may be performed with in the PTE by a XRM and/or ERM on behalf of the untrusted device may include authentication, random number generation, controlling access to services, controlling privileges, encryption, decryption, data tagging, protected document transfer, signature verification, key exchange, trusted input/output, and/or the like. The PTE may utilize the situational awareness of the user of the untrusted device to achieve an increased level of security or trust for an untrusted device. The PTE may thus allow the use of commercial hardware and/or software (e.g., untrusted applications) while maintaining additional levels of security to protect classified or sensitive data in addition to the security functionalities provided by the untrusted device. The PTE may be utilized to protect mobile devices and other hardware and/or enterprise resources and networks.

Use of the PTE may allow the desirable features of COTS devices (e.g., intuitive and familiar user interfaces, diverse and evolving commercial functionality, cost effectiveness, etc.) to be used while maintaining additional levels of security, for example using a trusted hardware component. The trusted hardware component may be an XRM, which may be a trusted-hardware processing device that is local to the user, and/or an ERM, which may be a trusted-hardware processing device in communication with the untrusted device over a communication network (e.g., a server in an enterprise network setting). The XRM and/or ERM may be used to provide additional security functionality for an untrusted device included in the PTE. The XRM and/or ERM may be configured to enforce the security policies associated with the PTE.

Establishing a PTE may permit the establishment of additional levels of cyber trust towards the untrusted device. For example, an XRM and/or ERM may be configured to enhance the natively available security features of the untrusted device. These additional security measures, for example when combined with the situational awareness of the user, may create an additional layer of cyber trust when performing sensitive tasks within the PTE (e.g., on the untrusted device). The XRM and/or ERM may also act as a single credential repository for the PTE, and therefore the untrusted device. The XRM and/or ERM may provide secure storage for sensitive data such as cryptographic keys and/or may be configured to securely generate sensitive data such as cryptographic keys. The XRM and/or ERM may be configured to securely update sensitive data such as cryptographic keys.

Moreover, the PTE may be utilized to manage security across multiple trusted and/or untrusted devices being utilized by a user. For example, the XRM and/or ERM may be used to integrate a plurality of untrusted (or even trusted) devices such that the control and operation of the devices may be maintained within the PTE. As an example, the XRM and/or ERM may be configured to manage passwords for one or more devices (e.g., manage password requests, password creation, etc.). For example, the user may store authentication credentials for one or more services (e.g., usernames, passwords, certificates, shared secrets, etc.) at the XRM and/or ERM. When the user attempts to authenticate himself to the one or more of the services (and/or when one or more of the services attempts to authenticate itself with the user), the authentication may be performed via the XRM and/or ERM. If the user successfully authenticates with the XRM and/or ERM, the XRM and/or ERM may then authenticate the user with/to one or more other services, for example based on the credentials stored on the XRM and/or ERM. Similarly, the XRM and/or ERM may manage user names and other credentials (e.g., accounts, memberships, identities, etc.) for the user.

The XRM and/or ERM may be configured to control access methods to the managed devices within a PTE and/or control the privileges of the applications running on the devices. The XRM and/or ERM may enforce the access rules using the monitoring features described herein. For example, the XRM and/or ERM may monitor the untrusted device in order to manage which users/user accounts access certain applications or data stored on the untrusted device. The XRM and/or ERM may manage secure materials utilized by the untrusted devices in order to prevent the untrusted devices from compromising the secure materials. For example, the XRM and/or ERM may manage the cryptographic keys utilized by the devices. In this way, the XRM and/or ERM may act as a secure portable persona (SPP) for the user (e.g., act as a repository to manage credentials and/or other personal/business/classified data). The data that is stored on the XRM and/or ERM may be associated with additional levels of security as compared to data that is stored on the untrusted device due to the trusted nature of the hardware used to construct the XRM and/or ERM.

A PTE may be utilized in order to manage transactions that are performed by one or more untrusted devices on behalf of the user. For example, an XRM and/or ERM may be configured to monitor transactions performed by an untrusted device and/or to perform certain transactions on behalf of the user of the untrusted device. The XRM and/or ERM may be charged with providing secure interaction processes and mechanisms that facilitate standard practice procedures (SPP) and cognizant security authority (CSA) engagement during exchanges with communication peers. For example, the XRM and/or ERM may ensure that transactions are performed in accordance with predefined procedures and/or with the expected communication peer (e.g., not with an impersonator). The XRM and/or ERM may act at as a secure management services (SMS) manager for the PTE. For example, the XRM and/or ERM may configure, monitor, and/or enforce PTE configurations and policies, as well as administer, maintain, and/or provision PTE resources. As a result, the XRM and/or ERM may assign resources or services to host devices, platforms, and/or individuals and may be configured to control the dynamic sharing of information within the PTE.

The PTE architecture may include one or more components. For example, FIG. 1 illustrates an example PTE architecture. In the example illustrated in FIG. 1, one or more users may be operating within the PTE (e.g., User 110, User 120). Users may be associated with one or more untrusted devices for which additional levels of assurance and/or security are to be provided via the PTE. For example, User 110 may operate Untrusted Device 112 and User 120 may operate Untrusted Device 122. Although the users are shown to be associated with a single untrusted device in FIG. 1, the users may be associated with one or more untrusted devices. Users may also use and/or be associated with an XRM. For example, User 110 may be associated with XRM 114 and User 120 may be associated with XRM 124. The XRMs may provide security services and/or PTE compliance monitoring for the untrusted devices associated with their user. For example, XRM 114 may interact with and monitor Untrusted Device 112 and XRM 124 may interact with and monitor Untrusted Device 122. Each XRM may be specific to a single user or may be shared among multiple users (e.g., shared by a predetermined group of users).

The XRMs may provide CSA services to enhance the security of the untrusted devices. In an example, the XRMs may be configured to provide Secure Communications Interoperability Protocol (SCIP) modes for their respective untrusted devices. By doing so, the XRMs may enable the untrusted devices to interface to legacy SCIP devices such as Other Devices 130. Rather than or in addition to the SCIP modes being provided by the XRMs, ERM 104 may provide the SCIP modes to one or more of Untrusted Device 112 and/or Untrusted Device 122. ERM 104 may provide similar services to Untrusted Device 112 and Untrusted Device 122 as those provided by XRM 114 and XRM 124, although ERM 104 may communicate with the untrusted devices over a communication network (e.g., may be remote devices). PTE Manager 102 may be configured to provide SMS for organizations and/or individuals within the PTE. PTE Server(s) 106 may perform other functions for the PTE as is described below. For example, PTE Server(s) 106 may serve as a Key Management (KM) interface to a network such as a mobile network. The XRMs and/or ERMs may be configured to support secure Commercial Solutions for Classified (CSfC) communication between untrusted devices. SCIP and CSfC communications may be described in more detail below.

The PTE may be designed to provide an additional layer of trust or security to one or more untrusted devices, so the one or more untrusted devices may be considered part of the PTE architecture. The one or more untrusted devices may be modified to include modules designed to facilitate interactions between the untrusted device and other PTE components. For example, the operating system, the kernel, and/or the applications executing on the untrusted device may be modified to include one more modules that facilitate the monitoring and/or security functions performed by the XRM and/or ERM. The aggregation of the modules included in the untrusted device to facilitate PTE operation may be referred to as an internal reference monitor (IRM). For example, an IRM may be installed/configured on a untrusted device and may control the communications between the untrusted device and the XRM and/or ERM. The IRM may perform actions on behalf of the XRM and/or ERM at the untrusted device in order to enforce policies or procedures of the PTE.

For example, the IRM may include a secure communication application (SCA). The SCA may be an application installed on the untrusted device that communicates information regarding the untrusted device to an XRM and/or ERM in order to establish a secure communication session using the untrusted device. The module installed on the untrusted device that may be configured to interface with the other PTE components (e.g., XRM, ERM, PTE Manager, etc.) may be referred to as an PTE interfacing application (PIA). The PIA may be configured to provide CSA and SPP interface/support on the untrusted host platform (e.g., Secure Call and CSA monitoring applications). As an example, the application on the untrusted device/PIA may answer XRM and/or ERM requests regarding the untrusted device, may send diagnostics regarding the untrusted device to the XRM and/or ERM, may control interactions/communications with the XRM and/or ERM from the perspective of the untrusted device, may send requests to the XRM and/or ERM, and/or may otherwise act as a local client for the XRM and/or ERM within the untrusted device.

The IRM installed on the untrusted device may also include a Resident Verify Interface (RVI) application that may be configured to monitor the actions performed by the untrusted device, the state of the untrusted device (e.g., the identity of currently executing applications; the contents of memory locations; current configurations including permissions, user accounts, OS settings, etc.; tasks/threads currently being executed; access to processing components; etc.), and/or transactions involving the untrusted device. The RVI may interact with the PIA in order to coordinate with the XRM and/or ERM. For example, the RVI may send information regarding the state of the untrusted device and/or past actions performed by the untrusted device to the ERM via the PIA.

The SCA for the untrusted device may also include a Secure Voice Application (SVA). The SVA may be configured to facilitate secure calls on the untrusted device. The SVA may interact with an XRM and/or ERM (e.g., via the EIA, via a local radio connection, etc.) in order to establish a secure call. For example, the SVA may interact with an ERM and/or XRM in order to receive cryptographic keys for a given communication session. The SVA may also rely on authentication procedures performed by the XRM and/or ERM (e.g., authenticating the user of the untrusted device, authenticating the communication peer, etc.) prior to establishing a secure call using the untrusted device.

The SCA for the untrusted device may also include a Thin Client Application (TCA) for communicating with a thin client server in the ERM. The TCA may be configured to communicate with the thin client server in the ERM so that the thin client server can perform one or more security related functions for the untrusted device.

The PTE may also include the XRM and/or the ERM. In one example, a local XRM may be used to manage a PTE for an untrusted device, and the ERM may be omitted from the PTE. In another example, an ERM that communicates with the untrusted device may be included in the PTE, and a local XRM may be omitted. In another example, both a network connected ERM and a local XRM may be used to manage one or more untrusted devices within a PTE. As may be appreciated, the examples described herein may be equally applicable to each of these scenarios, although there may be some modification of signaling and/or how information may be presented to the user.

An XRM may be configured to provide trusted hardware CSA and SPP capabilities, for example which may be communicated/coordinated with an ERM, the untrusted platform, a PTE Manager, and/or other components. In an example, the XRM may be hosted in secure hardware that may be NSA Type 1 compliant.

The ERM may be configured to provide CSA and SPP support for centralized technology services (e.g., Secure Call and CSA monitoring applications). The ERM may be hosted in a server or server blade that is accessible to the other devices within the PTE. An ERM may control or facilitate an untrusted device's access to network resources.

A PTE may include a PTE Manager. The PTE Manager may be configured to provide SMS for organizations and/or individuals within the PTE. For example, the ERM may be configured to communicate with the XRM through communication systems of the untrusted device (e.g., Smartphone). The PTE may communicate with the ERM to manage the PTE.

The PTE may include one or more Customer Unique Application (CUAs) which may be applications hosted in one or more other components of the PTE. For example, the CUAs may be hosted the same server as the ERM or may be hosted in different servers, such as PTE servers. A CUA may also be included within an XRM. The CUAs may be designed to address application specific services to be provided within the PTE. For example, the SCIP may be an example of a protocol used for secure voice and data communication. SCIP may be designed to operate over the wide variety of communications systems, for example commercial land line telephone, military radios, communication satellites, Voice over IP, and/or different cellular telephone standards. The processing of setting up a SCIP call/data transfer may include one or more of key management, voice compression, encryption, signaling plan, and/or the like. A CUA may be used to facilitate SCIP calls and data transfers involving untrusted devices within the PTE.

Utilization of the PTE may enable additional security layers to be achieved for untrusted devices. For example, the security monitoring, policy enforcement, storage of secure data, and/or active handling of sensitive processing tasks by the XRM and/or ERM may facilitate the additional cyber protection of a COTS smartphone device. The PTE architecture may facilitate a CSfC secure call capability between untrusted devices that are managed by one or more PTEs. For example, the XRM and/or ERM may enforce policy rules and/or otherwise allow two untrusted devices to achieve the security requirements for NSA Type 1 secure voice calls and/or secure data calls. In an example, the XRM and/or ERM may enforce policy rules and/or otherwise allow an untrusted device to establish a legacy secure call with a secure device, for example using SCIP. The XRM and/or ERM may also be Type 1 tamper protected and hence may be configured to store a Type 1 certificate for Type 1 communications. The PTE architecture may allow classified material to be stored outside the untrusted devices, for example by storing the sensitive material with PTE components such as the XRM and/or ERM. Secure email, secure data transfer, and/or secure data storage may also be achieved via the XRM and/or ERM.

The trusted hardware security module external to an untrusted device (e.g., XRM and/or ERM) may assist the COTS device with meeting security conditions (e.g., Type 1 security conditions). For example, the external security module may perform one or more functions such as monitoring the COTS device during operation, enforcing security rules, providing feedback to the user regarding the level of security, assisting with authentication, storing security credentials (e.g., device and/or session keys), managing security credentials (e.g., key management), providing strong authentication, providing a trusted operator interface, and/or performing other security functions. The external security device may communicate continuously and/or intermittently with the untrusted device over a communication medium (e.g., Bluetooth, near-field communications (NFC), Internet Protocol (IP) communications, etc.). The external security device may be a hardware token (e.g., XRM) and/or a trusted server in communication with the untrusted hardware (e.g., ERM).

Figure 2:
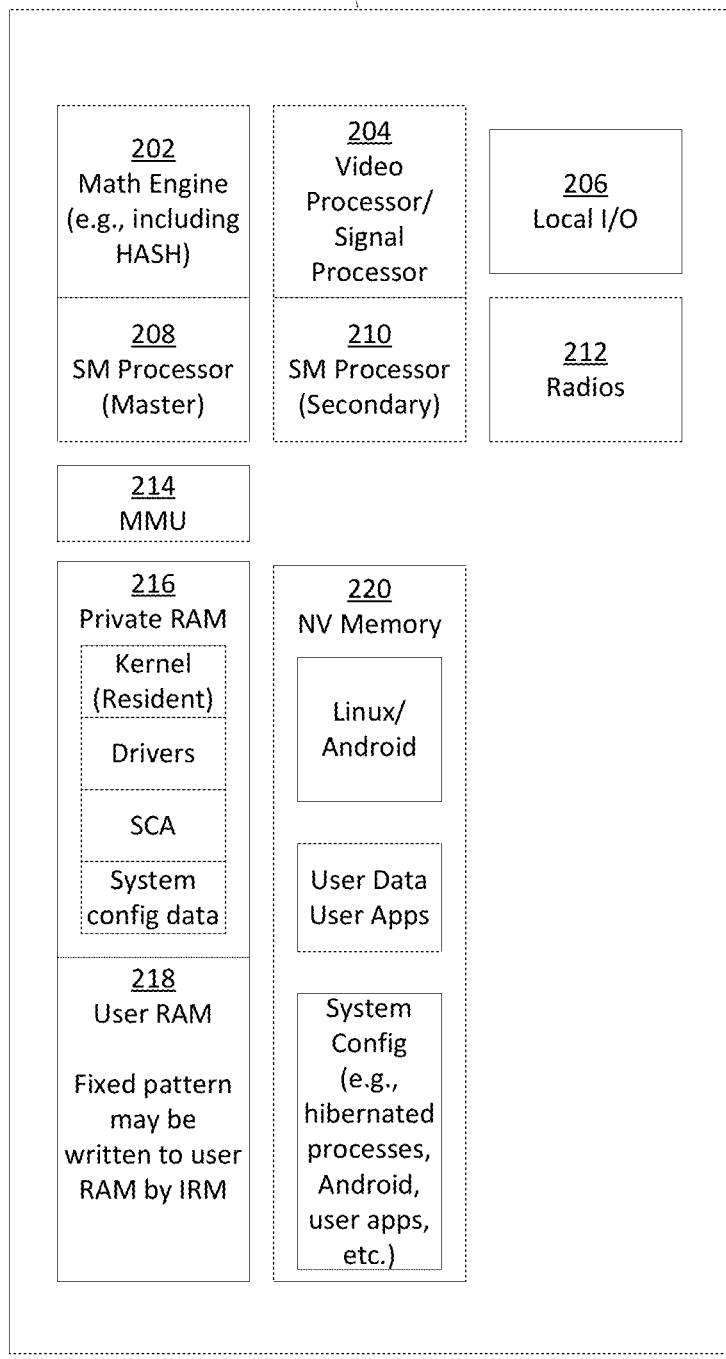
FIG. 2 illustrates an example untrusted device that includes a secure communications application (SCA).

FIG. 2 illustrates an example architecture for a modified COTS smartphone that may be an untrusted device. In this example, the COTS smartphone may be modified to include one or more modules designed to facilitate interactions between the untrusted device and other PTE components (e.g., an IRM). The modules may be configured to perform one or more security functions in coordination with an XRM and/or ERM, such as policy enforcement, security monitoring, etc. For example, Untrusted Device 200 may be modified such that it may operate in two modes of operation. In a first mode, Untrusted Device 200 may operate as a typical COTS smartphone (e.g., without interactions with other nodes in the PTE). In a second mode of operation Untrusted Device 200 may operate in a secure manner, for example according to a configuration loaded on the device for interactions with the PTE. In the second mode of operation, the applications running on the untrusted device may be limited to a predetermined whitelist to ensure unauthorized applications do not have access to sensitive data. In an example, applications included in a blacklist may be suspended or hibernated when performing secure communications or operating in a secure mode. The transitions between the different modes of operation may be controlled by an IRM, for example via SCA that is installed on Untrusted Device 200. The transitions may be triggered by an XRM and/or ERM.

Untrusted Device 200 may include one or more components typically found in a COTS smartphone, for example Video Processor/Signal Processor 204, Local I/O 206 (e.g., USB, touchscreen, speaker, keyboard, microphone, etc.), Radios 212 (e.g., cellular radios, WiFi, Bluetooth, NFC, etc.), Symmetric Multi (SM) Processor 208, SM Processor 210 (e.g., if dual or multi core processing is used), etc. Additionally, Untrusted Device 200 may include Math Engine 202, for example to perform hashing functions. As part of the functionality for providing security for Untrusted Device 200 within a PTE, MMU 214 may be included in the IRM and may be configured to manage the memory of Untrusted Device 200, for example by coordinating memory usage with an XRM and/or ERM.

For example, MMU 214 may enforce a partition of the Random Access Memory (RAM) within Untrusted Device 200 into Private RAM 216 and User RAM 218. Private RAM 216 may be utilized by the IRM (e.g., RVI components) to enforce PTE rules and policies. For example, the IRM may be instantiated in Private RAM 216 and may include a resident kernel that may be configured to capture RAM configurations using a hash function via Math Engine 202. A SCA may be instantiated in Private RAM 216 for enforcing rules related secure communications for the PTE. For example, when the user of Untrusted Device 200 wishes to perform a secure communication (e.g., voice or data), the SCA may be executed. The SCA may establish a secure mode of operation for Untrusted Device 200.

During secure mode operation, the native OS and/or other user applications may be put into a hibernation mode where they may lack access to system resources. When referred to herein, the untrusted/native OS may refer to the operating system installed in the COTS device that allows a user to interact with the applications running on the device (e.g., Android, Windows, Windows Phone, iOS, etc.). The term kernel may refer to the core or lowest level of the system that may be configured to provide access to underlying hardware resources. In an example, the kernel may be implemented at a functional lower level than the operating system and may be the operating system's interface to the underlying hardware resources of the untrusted device (e.g., via a library or other directories). The kernel may be implemented in Linux and may include modules such a system drivers and/or system firmware. The operating system may be the functional component that controls the operation of the applications running on the untrusted device. The operating system may interact with the hardware of the trusted device via the kernel.

During operation in secure mode, the system configurations data, data for the native OS, and/or user application data for hibernated processes may be stored in Non-volatile (NV) Memory 220. Additionally, during secure mode of operation a fixed pattern may be written to User RAM 218 by the IRM (e.g., SCA) to ensure attacks cannot make use of User RAM 218. User RAM 218 may be a portion of RAM that is not used by the IRM functions and/or applications. The IRM may periodically or intermittently check to ensure that the fixed pattern has not changed during secure operation. During secure operation, the IRM may control and monitor operation of Untrusted Device 200. Upon egress from the secure mode, the native OS and user apps are allowed to resume, for example using User RAM 218.

Figure 3:
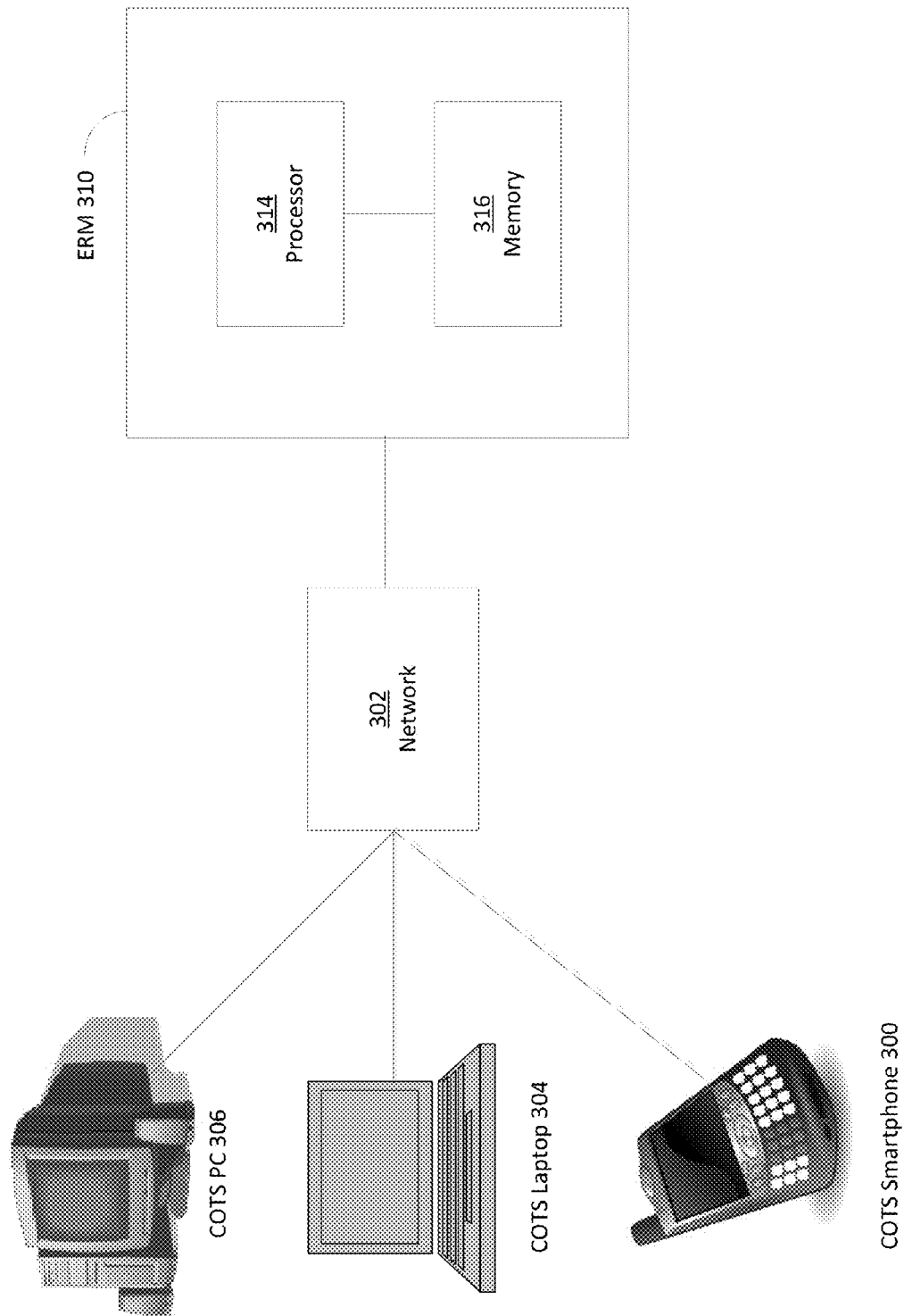
FIG. 3 illustrates an example of an enterprise PTE with multiple COTS devices managed by an ERM.

FIG. 3 illustrates an example of an ERM implemented in a server that may communicate with/manage one or more untrusted devices over a communication network. As an example, one or more of COTS Smartphone 300, COTS Laptop 304, and/or COTS PC 306 may communicate over Network 302. One or more enterprise applications may be executed over Network 302. For example, applications for online shopping, online payment processing, automated billing, security, content management, IT service management, etc. may be executed over Network 302. For example, client applications operating on one or more of COTS Smartphone 300, COTS Laptop 304, and/or COTS PC 306 may communicate with ERM 310. A host application stored in Memory 316 and executing on processor 314 may communicate with the client applications and may perform one or more functions on behalf of COTS Smartphone 300, COTS Laptop 304, and/or COTS PC 306. For example, ERM 310 may be configured to provide security functions for the devices communicating over the enterprise communication network. ERM 310 may control access to network resources (e.g., resources within Network 302) by COTS Smartphone 300, COTS Laptop 304, and/or COTS PC 306.

In an example, Network 302 may be an enterprise communications network maintained by network operator. Network 302 may be a cellular voice and/or data network, the Internet, a Wi-Fi network, a local area network (LAN), a wide area network (WAN), a wireless local area network (WLAN), an enterprise network, and/or any network capable of supporting communications to/from one or more of COTS Smartphone 300, COTS Laptop 304, and/or COTS PC 306. ERM 310 may also be in communication with Network 302. ERM 310 may include Processor 314 and Memory 316. ERM 310 may perform similar functions as XRM 210 and/or XRM 110. Additionally, since ERM 310 is unlikely to be co-located with COTS Smartphone 300, COTS Laptop 304, and/or COTS PC 306, ERM 310 may communicate information regarding the security status of one or more of COTS Smartphone 300, COTS Laptop 304, and/or COTS PC 306 to the appropriate device for display to the user. Although such an architecture may provide slightly less secure display to the user than directly displaying the status from a local trusted hardware component (e.g., the XRM), using ERM 310 may still protect secure assets while have the benefit of allowing COTS Smartphone 300, COTS Laptop 304, and/or COTS PC 306 to be operated in a secure state without the user having physical possession of an XRM. For example, ERM 310 may block access of a compromised COTS element from accessing secure data or block the compromised COTS element from attempting to set up a secure call.

For example, a user may access a webpage or application on COTS Smartphone 300, COTS Laptop 304, and/or COTS PC 306 to contact and/or determine the status of ERM 310. In an example, a user may use a web browser on COTS Smartphone 300, COTS Laptop 304, and/or COTS PC 306 to access a webpage that displays details about the current communication session, the status of the user and/or communication peer, etc. The contents of the page may be generated by ERM 310 (e.g., XRM, other trusted hardware, untrusted hardware being monitored by trusted hardware). COTS Smartphone 300, COTS Laptop 304, and/or COTS PC 306 may display an icon that indicates the level of assurance being provided by ERM 310. In an example, the security information determined by ERM 310 may be displayed on other trusted hardware capable of communications with ERM 310 that may be in the vicinity of the user of COTS Smartphone 300, COTS Laptop 304, and/or COTS PC 306. COTS Smartphone 300, COTS Laptop 304, and/or COTS PC 306 may have installed SCAs for communicating with ERM 310 and/or for enforcing security policies and procedures as dictated by ERM 310. For example, the SCA may cause one or more of COTS Smartphone 300, COTS Laptop 304, and/or COTS PC 306 to transition between a normal mode of operation and a secure mode of operation, for example depending on whether a secure communication is to be performed.

Figure 4:
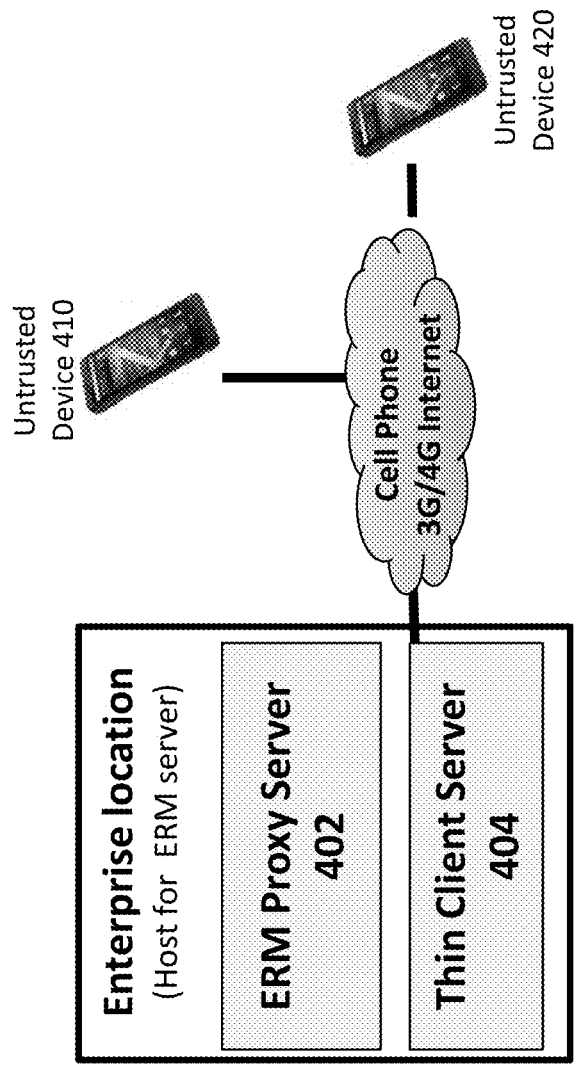
FIG. 4 illustrates an example architecture for COTS smartphones in communication with an ERM.

FIG. 4 illustrates an example architecture where one or more untrusted device may be managed by an ERM. For example, Untrusted Device 410 and Untrusted Device 420 may include IRMs with SCAs. The SCA may manage the mode of operation for the untrusted devices (e.g., secure, normal) and/or may be in operable communication with ERM Proxy Server 402 via a communication network (e.g., Cell Phone 3G/4G Internet network in FIG. 4). ERM Proxy Server 402 may act as a communication point for the PTE related requests for the SCAs installed on Untrusted Device 410 and Untrusted Device 420. For example, when Untrusted Device 410 attempts to call Untrusted Device 420 in a secure manner (or vice versa), ERM Proxy Server 402 may prevent the call from being performed until ERM Proxy Server 402 has validate Untrusted Device 410 and Untrusted Device 420.

Thin Client Server 404 may include applications and/or data used by the ERM to manage the PTE for Untrusted Device 410 and/or Untrusted Device 402. Thin Client Server 404 may rely on one or more other servers (e.g., PTE servers—not shown in FIG. 4) for executing applications and/or processing requests. ERM Proxy Server 402 and Thin Client Server 404 (as well as one or more other servers that may be used to provide ERM and/or PTE management functionality) may be collectively referred to as an ERM. The ERM may refer to a collection of one or more network nodes that provide the security management for and/or increase the level of trust in one or more untrusted devices.

The ERM may interface with the untrusted devices in order to actively provide security functions and/or to interactively monitor the operation of the untrusted devices. For example, active security services that may be provided by the ERM may include support for secure voice calls, authentication services, secure remote access (e.g., via the Secure Thin Client), automated key management, automated key generation and storage, security policy management, and/or the like. Examples of interactive monitoring performed by the ERM may include sequence monitoring, Known Answer Tests (KATs), challenge/response, MMU functions, etc.

The trusted hardware security module external to the untrusted device (e.g., XRM and/or ERM) may assist with meeting security conditions for a desired application. In an example, the XRM may be utilized for meeting Type 1 security requirements for Secret and/or Top Secret voice and data communications. The XRM may provide independent monitoring and/or enforcement functions for one or more cryptographic devices. The XRM may ensure that an untrusted hardware platform meets security rules and fail-safe requirements.

Figure 5:
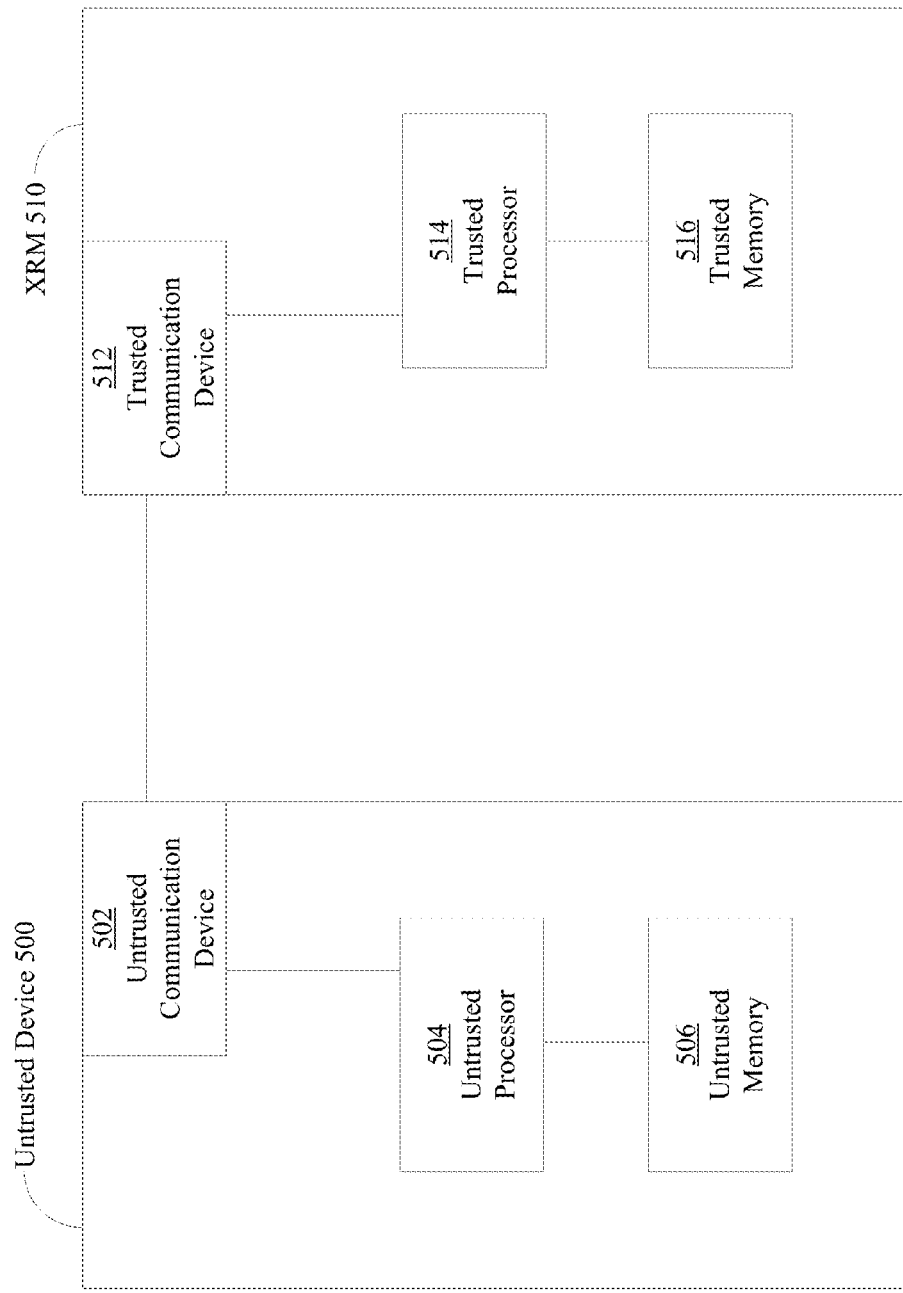
FIG. 5 illustrates an example architecture including an untrusted device and an XRM.

FIG. 5 is an example system diagram of an untrusted device and an XRM. In the example illustrated in FIG. 5, both Untrusted Device 500 and XRM 510 may be local to the user. For example, Untrusted Device 500 may be a smartphone and XRM 510 may be a token that is local to (e.g., in the same location as) the user. Untrusted Device 500 may be any device for which additional security is desired, for example a COTS device. For a variety of reasons, a user of Untrusted Device 500 may be unable to verify that Untrusted Device 500 meets a desired set of security requirements. For example, a security status of Untrusted Device 500 may be unknown to the user. In another example, Untrusted Device 500 may be associated with a certain level of security, and XRM 510 may provide an additional layer of security, for example in order to meet the desired set of security requirements.

Untrusted Device 500 may include Untrusted Processor 504 and/or Untrusted Memory 506. Untrusted Memory 506 may be a tangible, computer-readable medium configured to store data and/or computer executable instructions. Untrusted Processor 504 may be configured to execute the computer executable instructions stored on Untrusted Memory 506. Untrusted Processor 504 may be configured to perform one or more functions such as a security function. For example, Untrusted Processor 504 may perform authentication and/or encryption/decryption. Untrusted Device 500 may include Untrusted Communication Device 502 (e.g., an untrusted transceiver or other communication means). In an example, one or more hardware modules included in Untrusted Device 500 may be unsecure and/or the security status of the module may be unknown. For example, one or more of Untrusted Communication Device 502, Untrusted Processor 504, and/or Untrusted Memory 506 may be considered untrusted because the user of Untrusted Device 500 may be unable to verify that the security level associated with the hardware of Untrusted Device 500 is able to meet the desired security level for the user for a given task. An example of unsecure hardware may be hardware that was manufactured outside of a designated high-assurance environment. For example, a Type 1 product may be a device or system certified by the NSA for use in cryptographically securing classified U.S. Government information. If a device is manufactured in a non-NSA certified facility, the device may be considered unsecure and/or may not be a Type 1 product. XRM 510 may be configured to provide security functionality (e.g., similar to a Type 1 certified device) for an untrusted platform.

Untrusted Communication Device 502 may be configured to communicate with Trusted Communication Device 512 of XRM 510. For example, Untrusted Communication Device 502 may communicate with Trusted Communication Device 512 via Bluetooth, Near Field Communications (NFC), Wi-Fi, Ethernet, using IP protocols, via a communication network, using wireless signals, using a direct physical connection, and/or the like.

XRM 510 may include Trusted Processor 514 and/or Trusted Memory 516. Trusted Memory 516 may be a tangible, computer-readable medium configured to store data and/or computer executable instructions. Trusted Processor 514 may be configured to execute the computer executable instructions stored on Trusted Memory 516. Trusted Processor 514 may be configured to provide security assurance for Untrusted Device 502. For example, XRM 510 may communicate with Untrusted Device 500 via Trusted Communication Device 512 in order to monitor functions being executed by Untrusted Processor 504. In an example, XRM 510 may provide a type of security challenge to Untrusted Device 500. XRM 510 may determine a security status of Untrusted Device 500 based on a response to the security challenge provided by Untrusted Device 500.

XRM 510 may be implemented in a variety of hardware devices. For example, XRM 510 may be implemented in an external module that is coupled to Untrusted Device 500 (e.g., a micro-Secure Digital (SD) card, a subscriber identity module (SIM) card, a module such as flash memory coupled to Untrusted Device 500 using interface such as universal serial bus (USB), etc.). XRM 510 may be a small, lower power device that functionally independent of Untrusted Device 500, but that is in operable communication with Untrusted Device 500.

XRM 510 may be utilized to perform one or more security functions on behalf of Untrusted Device 500. For example, one or more of the NSA's Information Assurance Requirements Directive (IASRD) security requirements may be met by XRM 510 on behalf of Untrusted Device 500. Example security functions that may be performed by XRM 510 may include memory management, determining and/or verifying checksums, determining and/or verifying cyclic redundancy checks (CRCs), data labeling, sequence monitoring, etc. Additionally, it may be possible to transfer security functions from Untrusted Device 500 to XRM 510, for example to assist with meeting fail-safe requirements (e.g., preventing tampering, prevent unauthorized events, control access to control keys, etc.).

Figure 6:
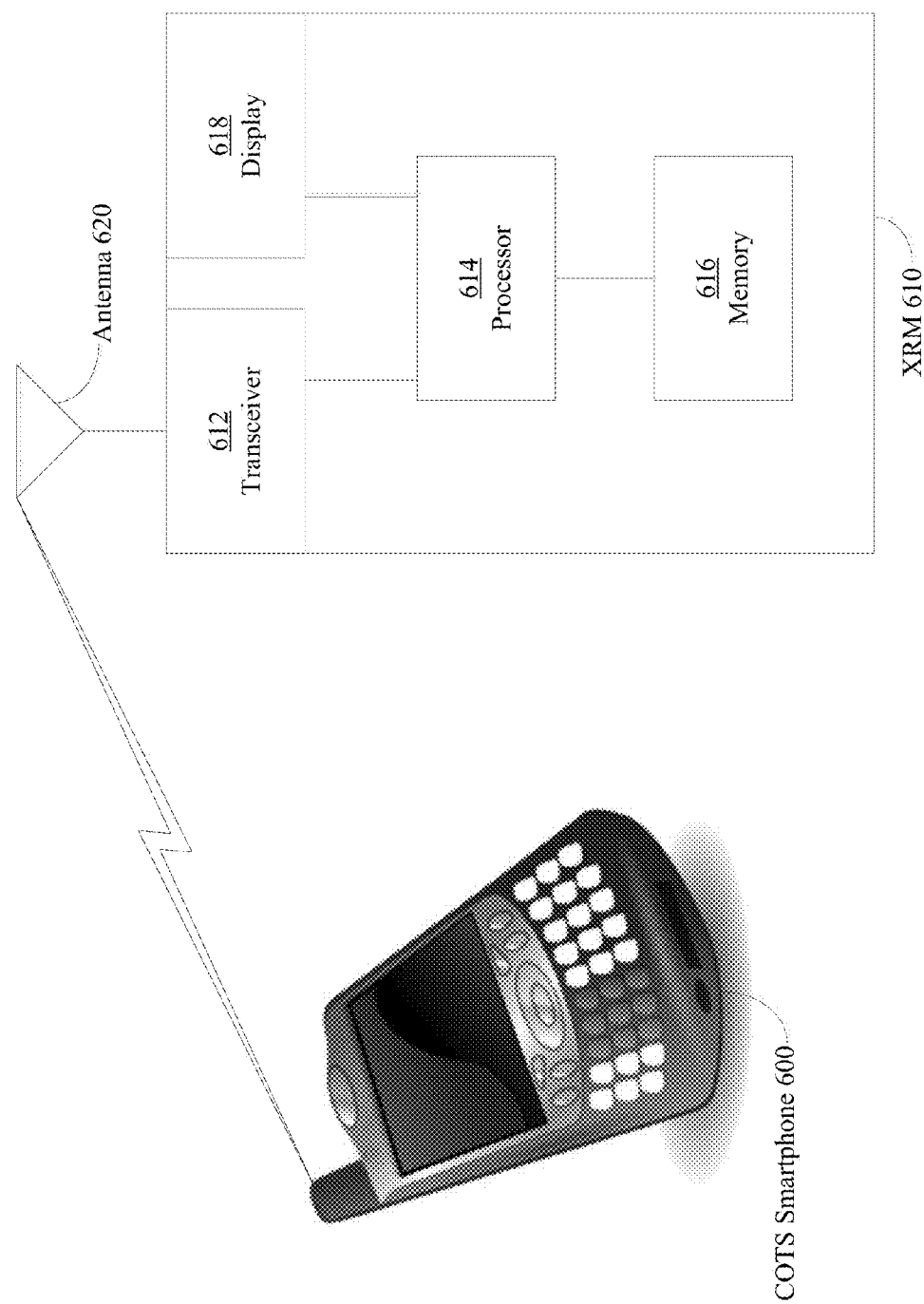
FIG. 6 illustrates an example architecture for a COTS smartphone to communicate with an XRM.

FIG. 6 illustrates an example system for wherein the XRM may communicate with a COTS Smartphone. For example, XRM 610 may be a small, tamper-protected device that a user may keep near COTS Smartphone 600 or other workstation. XRM 610 may include one or more Antenna(s) 620 and Transceiver 612, which may provide operable communications with COTS Smartphone 600. XRM 610 may include Processor 614, Memory 616, and/or Display 618. Although not shown, XRM 610 may also include one or more input/output devices. Display 618 may be a touchscreen display capable of receiving inputs. In an example, Display 618 may indicate the current security status of COTS Smartphone 600. For example, a green Light Emitting Diode (LED) may be illuminated during periods of time during which XRM 610 is properly monitoring COTS Smartphone 600 and has determined that COTS Smartphone 600 is operating in accordance with a desired security level. For example, during a secure call, if the communicating peer has been authenticated, the user of COTS Smartphone 600 has been authenticated, and/or COTS Smartphone 600 is properly encrypting the communication, XRM 620 may indicate the secure status to the user via Display 618. In an example, the green LED stop being illuminated when XRM 610 is no longer monitoring COTS Smartphone 600. In an example, a red LED may be illuminated or may flash if XRM 610 is unable verify that the phone is operating securely and/or if XRM 610 determines COTS Smartphone 600 is operating in an unsecure state. In an example, rather than use LEDs for indicating the security status, any other type of indication may be included in Display 618.

Display 618 may display one or more items of information regarding the security status of the user of COTS Smartphone 600, a communicating peer, communications between COTS Smartphone and the communicating peer, and/or the status of XRM 610. Examples of the type of information that may be shown on Display 618 may be one or more of the following, in any combination: the authentication status of the user of COTS Smartphone 600, the authentication status of the communicating peer, the identity of the user of COTS Smartphone 600, the identity of the communicating peer, the security status of communications between COTS Smartphone 600 and the communicating peer, the security status of a phone call being conducted on COTS Smartphone 600, the strength of the communication link between XRM 610 and COTS Smartphone 600, the operating status of XRM 610, and/or other information regarding the operational status of COTS Smartphone 600. XRM 610 may include a battery power source, which may be rechargeable. In an example, an XRM may be implemented in a field-programmable gate array (FPGA) with a low power microcontroller.

Figure 7:
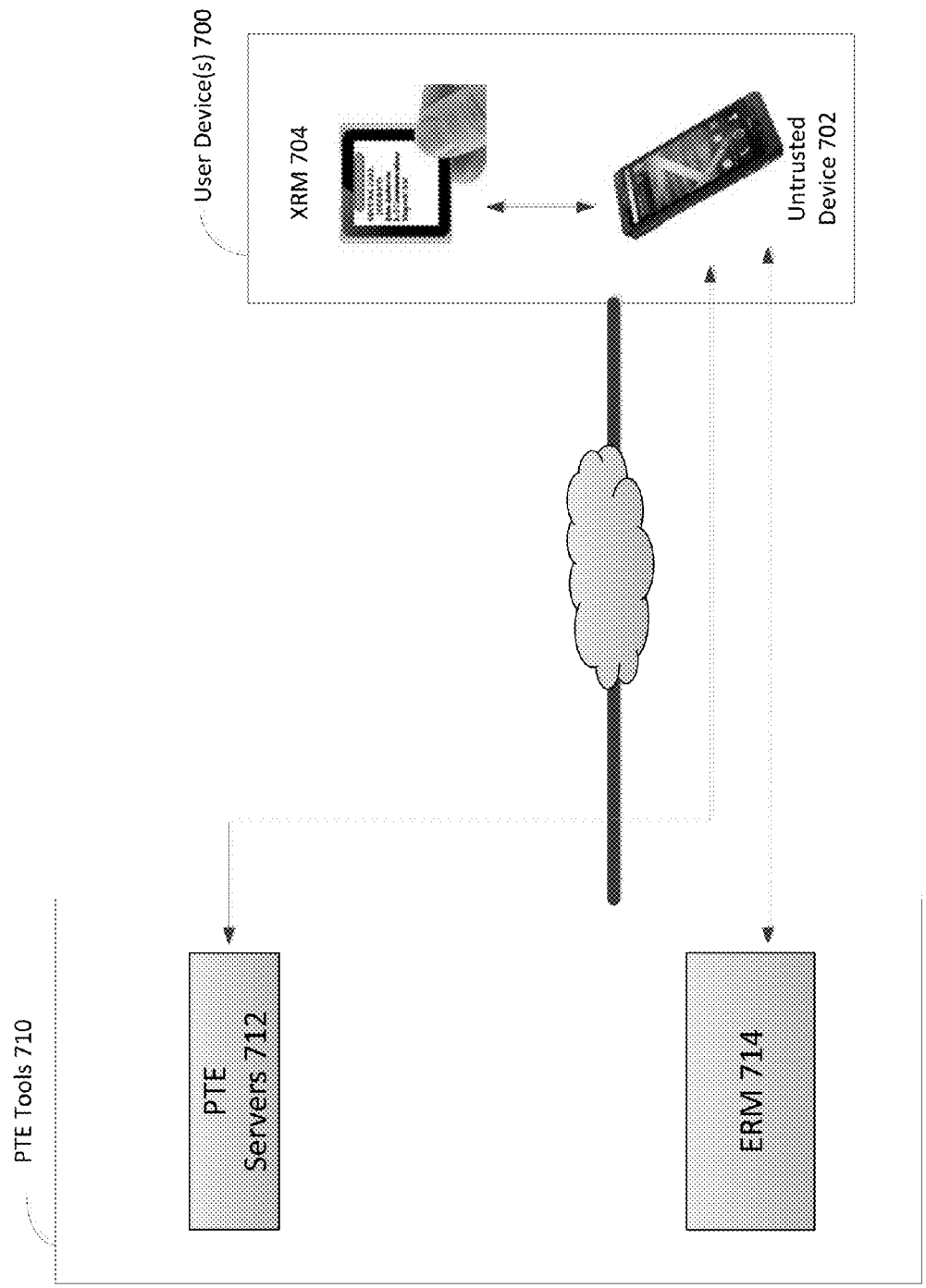
FIG. 7 illustrates an enterprise architecture that includes both an ERM and an XRM.

FIG. 7 illustrates an example enterprise architecture in which an ERM may be implemented in conjunction with a local XRM in order to further secure an untrusted device. For example, User Device(s) 700 may include one or more of Untrusted Device 702 and XRM 704. In the example illustrated in FIG. 7, Untrusted Device 702 may be a smartphone that includes one or more untrusted hardware and/or software modules. Although shown in FIG. 7, User Device(s) 700 may or may not include XRM 704. In some embodiments, XRM 704 may be used in conjunction with PTE Tools 710 to provide security functionality for Untrusted Device 702. For example, XRM 704 may be in communication with one or more of PTE Servers 712 and/or ERM 714 (e.g., via Untrusted Device 702) in order to assist PTE Tools 710 in performing security functions for Untrusted Device 702.

For example, PTE Servers 712 and/or ERM 714 may provide commercial services for Untrusted Device 702. For example, PTE Servers 712 and/or ERM 714 provide policy based management of Untrusted Device 702, XRM 704, and/or other devices within an Enterprise Network. As an example, PTE Tools 710 may provide a KM interface for mobile device networks. Although shown as separate functional modules in FIG. 7, PTE Servers 712 and ERM 714 may be located in a single server/processing device or may be located in separate servers/processing devices that are in operable communication over a communications network.

ERM 714 and XRM 704 may communicate via Untrusted Device 702 in order to provide additional security functionality for Untrusted Device 702. For example, Untrusted Device 702 may include one or more PTE applications that are configured to communicate with XRM 704. XRM 704 may receive information regarding the operational state and/or security level of Untrusted Device 702 from Untrusted Device 702, for example via a local communication medium (e.g., Bluetooth, NFC, etc.). XRM 704 may be configured to communicate with one or more of PTE Servers 712 and/or ERM 714 via Untrusted Device 702. For example, XRM 704 may send information to the PTE applications running on Untrusted Device 702, which may forward the information to the appropriate destination (e.g., PTE Servers 712 and/or ERM 714). In this way, XRM 704 may utilize the network connections (e.g., cellular data connection, IP connection, etc.) of Untrusted Device 702 to communicate with one or more of PTE Servers 712 and/or ERM 714. XRM 704 may send the information to untrusted Device 702 is an encrypted form, which may prevent compromised modules in Untrusted Device 702 and/or adversaries in the communications network from intercepting and/or modifying the data being communicated to PTE Tools 710. PTE Servers 712 and/or ERM 714 may send data to XRM 704 via Untrusted Device 702, for example via PTE applications running on Untrusted Device 702. Untrusted Device 702 may forward the data to XRM 704. XRM 704 may use the data to indicate a security status of Untrusted Device 702 to the user of Untrusted Device 702.

Any of the architectures illustrated in FIG. 1-7 may be utilized in order to create a PTE for an untrusted device. Depending on the type of security function being performed and/or the type of architecture being utilized, varying levels of security/assurance may be provided to a user of an untrusted device. For example, a combination of a local XRM in communication with an ERM may be able to provide a higher level of assurance regarding the security of the untrusted device to the user of the untrusted device than an ERM would be able to provide alone. However, the level of security assurance desired by the user may be function or application specific, so an appropriate architecture may be selected based on the security function to be provided. For example, to meet Type 1 security requirements, an XRM and/or an XRM and an ERM may be utilized. To meet non-Type 1 security requirements, an ERM alone or an XRM alone may be used.

Moreover, the security functions described below may be described in terms of a specific PTE architecture (e.g., using an XRM alone, using an ERM alone, using a XRM and ERM together, etc.). However, many of the security functions may be performed in a variety of PTE environments and an examples described with respect to a first PTE environment (e.g., an XRM in communication with an ERM) may be equally applicable to a second PTE environment (e.g., an ERM communicating with an untrusted device). Therefore, the examples described herein should not be considered to be limited to the specific architecture used for purposes of description, but should be interpreted to be applicable to any of the architectures disclosed herein unless stated otherwise.

The details of exactly what functions an XRM and/or ERM would provide and how the XRM would interact with a phone or workstation may vary and be heavily implementation and application specific. As may be appreciated one or more of the functions and structural features described herein may be applied in one or more combinations.

Figure 8A:
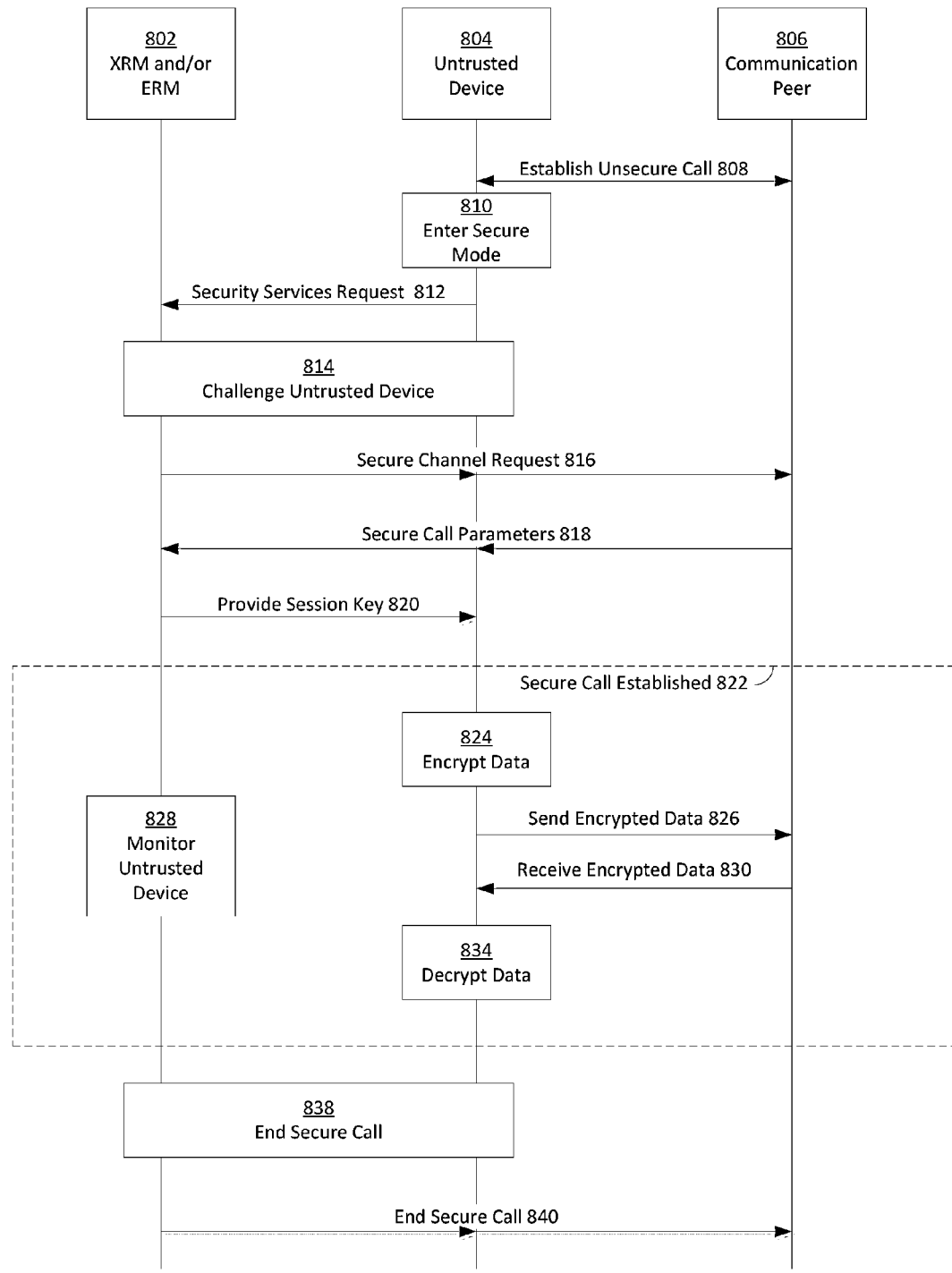
FIG. 8A illustrates an example sequence for establishing a secure call involving an untrusted device and an XRM and/or ERM.

In an example, a user of an untrusted device may desire to establish a secure voice call with a legacy secure communication device. For example, the user of the untrusted device may desire to use SCIP to establish a call with a communication peer. FIG. 8A illustrates an example signal diagram for a establishing a secure call from an untrusted device to a legacy secure device using an XRM and/or ERM. For example, XRM and/or ERM 802 may be part of a PTE with Untrusted Device 804. At 808, Untrusted Device may establish an unsecure call (e.g., normal phone call) with Communication Peer 806. If Communication Peer 806 is capable of communicating securely (e.g., using SCIP), then at 810 Untrusted Device 804 may attempt to establish a secure call with Communication Peer 806. For example, at 810 the SCA installed on Untrusted Device 804 may cause the Untrusted Device 804 to enter a secure mode of operation. During secure operation, the SCA may suspend one or more processes or applications running on Untrusted Device 804 that are not related to the establishment of the secure call. As an example, the normal operating system of Untrusted Device 804 may be suspended, and other applications other than the SCA may be suspended. In an example, native applications and functions above the kernel level that are not used for communication during the secure call (e.g., native applications, the native OS, other COTS features) may be hibernated.

The SCA may perform other actions such as turning off one or more parallel processing cores of Untrusted Device 804, the video subsystem of Untrusted Device 804, and/or digitals signal processing (DSP) subsystems of Untrusted Device 804. The SCA may overwrite application memory for applications other than the SCA and/or overwrite unused kernel memory. In an example, the memory used by the suspended OS may be overwritten. Examples contemplate that the kernel code/instructions may remain in RAM, although the kernel code may be inspected and/or validated by XRM and/or ERM 802 before, during, and/or after the secure call. Memory to be overwritten may be stored in non-volatile memory locations prior to being overwritten so that the OS and/or applications may be restored when the secure call ends.

At 812, Untrusted Device 804 (e.g., the SCA) may send a security services request to XRM and/or ERM 802 that may indicate that Untrusted Device 804 is attempting to establish a secure call with Communication Peer 806. At 814, prior to attempting to establish the secure call, XRM and/or ERM 802 may challenge, inspect, and/or otherwise test Untrusted Device 804 to determine whether Untrusted Device 804 is operating in accordance with the PTE rules and policies. XRM and/or ERM 802 may select a random challenge for Untrusted Device 804. For example, XRM and/or ERM 802 may issue a challenge to Untrusted Device 804 to determine whether one or more functions or applications such as the SCA are operating correctly, may request inspection of one or more memory regions with Untrusted Device 804, and/or may perform other security functions disclosed herein.

In an example, the challenge may be such that the SCA may call the OS service with a hash request. The hash request may be such that the kernel and/or other configuration data is hashed by the SCA for transmission to XRM and/or ERM 802. The SCA may perform the hash on the binary image of the kernel that is stored in the system RAM, so that the XRM and/or ERM 802 may inspect memory locations that could possibly be accessed and/or executed by the processor of Untrusted Device 804. The challenge may also request inspection of the images of applications and/or the suspended OS that have been stored prior to hibernation. The challenge may be time limited, and if XRM and/or ERM 802 does not receive a response prior to the expiration of a challenge timer, XRM and/or ERM 802 may consider the challenge to be failed and may refrain from establishing the secure call. XRM and/or ERM 802 may also authenticate the user of Untrusted Device 804, for example using a password or some other authentication method. Once the XRM and/or ERM 802 has determined that Untrusted Device 802 has successfully completed the challenge, XRM and/or ERM 802 may inform the user of Untrusted Device 804 that the challenge is complete (e.g., via a secure display if a local XRM is used and/or sending a message to Untrusted Device 804 if a local XRM or a remote ERM are used). The user of Untrusted Device 804 may enter the secure phone number to be used for the call, for example via the SCA and/or via a local XRM.

At 816 XRM and/or ERM 802 may send a secure channel establishment request to Communication Peer 806. In the case where XRM and/or ERM 802 is a local XRM the request may be sent through Untrusted Device 804, which may forward the request to Communication Peer 806. If an ERM is used, the request may be sent directly from the ERM to Communication Peer 806 via a communication network or the request may be forwarded via Untrusted Device 804. The security services request may include parameters used to establish the secure channel (e.g., crypto related parameters, etc.) and/or may include parameters used to perform authentication between the XRM and/or ERM 802/Untrusted Device 804 and Communication Peer 806. For example, XRM and/or ERM 802 may perform public key authentication with Communication Peer 806 or some other type of authentication. At 818 Communication Peer 806 may respond with Secure Call Parameters that may be used for the sure call. The secure call parameters may be used by XRM and/or ERM 802 to establish a session key for the secure call and/or may otherwise confirm the configuration to be used for the secure call. If any of the devices involved in the secure call (e.g., XRM and/or ERM 802, Untrusted Device 804, Communication Peer 806) fail an authentication procedure, the secure call may be prevented from being established.

Depending on the type/level of security to be used for the call, the encryption may be performed in Untrusted Device 804 or in XRM and/or ERM 802. For example, for Type 1 calls, an additional level of security may be achieved by performing the encryption within a local XRM, which may be a trusted hardware component. However, for some types of applications, XRM and/or ERM 802 may generate a session key for the secure call and at 820 may send the session key to Untrusted Device 804 for use in encrypting and/or decrypting secure call messages. Untrusted Device 804 may then use the session key for encryption while still protecting the main secret key (e.g., the key associated with user identity of the user of untrusted devices/XRM/ERM/PTE) from being compromised by sending it to the untrusted device. As an example, for non-Type 1 encryption (e.g., unclassified, CSfC, IPSec, Secure Socket Layer (SSL), Advanced Encryption Standard (AES), etc.), Untrusted Device 804 may perform the encryption/decryption, for example based on a session key provided for a given communication session. Additionally, if a local XRM is to be used, power savings may be achieved by performing the encryption in the untrusted device, as less processing capabilities would be utilized within the local XRM.

Once the secure call has been established at 822, the Untrusted Device may encrypt data to be transmitted to Communication peer 806 at 824, for example using the session key provided by XRM and/or ERM 802. At 826 Untrusted Device 804 may send the encrypted data to Communication Peer 806. During the secure call, at 830 Untrusted Device 804 may receive encrypted date from the communication peer. At 834, the Untrusted Device may decrypt data transmitted from Communication peer 806, for example using the session key provided by XRM and/or ERM 802. During the secure call session, at 828 XRM and/or ERM 802 may intermittently monitor and/or challenge Untrusted Device 804 to ensure that Untrusted Device 804 is operating in accordance with the policies and procedures of the secure call. The monitoring and/or challenges may be designed to ensure that the SCA has not been compromised and/or that untrusted/suspended modules of Untrusted Device 804 are not attempting copy or otherwise compromise secure data. If Untrusted Device 804 passes the test(s), the call may continue, but if a test is failed or no response is received within a predetermined time period, the secure call may be terminated and/or the user may be alerted to the failure and given a choice whether or not the secure call should be terminated.

At 838 one or more of XRM and/or ERM 802, Untrusted Device 804, and/or Communication peer 806 may determine to end the secure call. The SCA of Untrusted Device 804 may be configured to zeroize and/or randomize the voice buffers and/or the session key used for the call. The SCA may notify XRM and/or ERM 802 that the secure call is ending, for example if the termination of the call was triggered at Untrusted Device 804. XRM and/or ERM 802 may then challenge and/or test Untrusted Device 804, for example to determine whether the kernel and/or memory of Untrusted Device 804 is in accordance with the enforced security protocols and policies. Based on the response, XRM 802 may log that the call was successfully completed or may log an exception if an unexpected occurrence is detected. If the secure call was terminated by XRM and/or ERM 802 or Untrusted Device 804, at 840 XRM and/or ERM 802 and/or Untrusted Device 804 may inform Communication Peer 806 that the secure call has ended. The SCA of Untrusted Device 804 may restore the suspended applications and native OS to their pre-secure call states.

In an example, the communication peer may be another untrusted device with an associated XRM and/or ERM. For example, a secure communication session may be established between two devices that are both associated respective, local XRMs. In such as case, the local XRMs may communicate with each other via their respective untrusted devices. As an example, a first XRM may send a request to open a secure communication channel to a first untrusted device. The first untrusted device may then send that communication to a second untrusted device, for example via a cellular network connection. The second untrusted device may receive the message and forward it to its local XRM (e.g., a second XRM). The second XRM may then return encryption parameters using a similar messaging scheme.

Figure 8B:
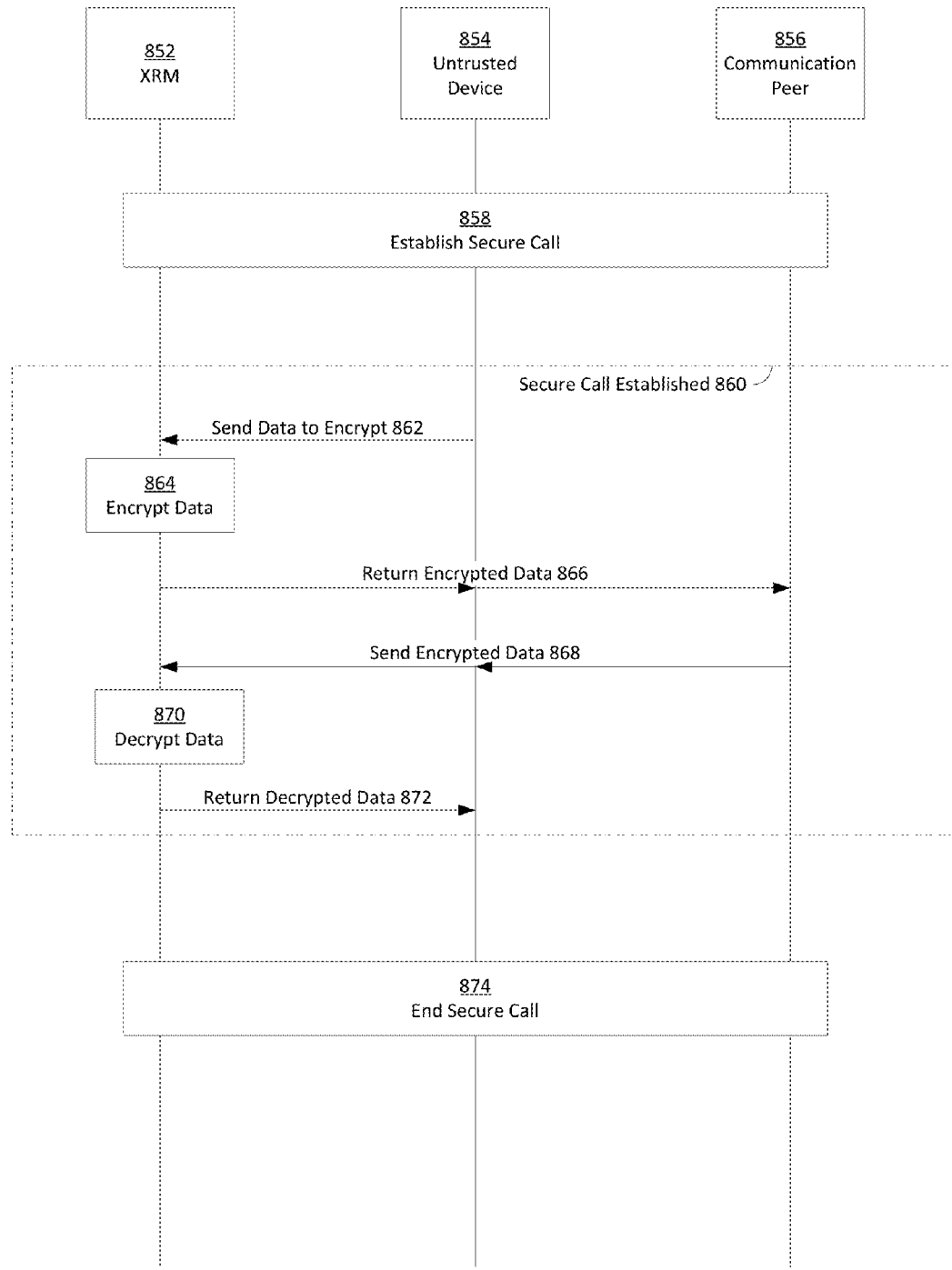
FIG. 8B illustrates an example secure call where encryption/decryption is performed within an XRM.

FIG. 8B illustrates an example secure call where encryption and/or decryption may be performed within a local XRM. As an example, Type 1 encryption (e.g., SCIP Type 1, classified calls, BATON, etc.) may perform encryption/decryption functions within XRM 852, while for non-Type 1 encryption (e.g., unclassified, CSfC, IPSec, SSL, AES, etc.), either XRM 852 or Untrusted Device 804 may perform the encryption/decryption, for example based on a session key provided for a given communication session.

For example, at 858 XRM 852, Untrusted Device 854, and/or Communication Peer 856 may establish a secure call session. The secure call may be established in a manner similar to the one described for between 808 and 818 of FIG. 8A. For example, authentication and session establishment may be performed between XRM 852 (e.g., on behalf of Untrusted Device 804) and Communication Peer 856. However, once the secure has been set up at 860, rather than or in addition to an XRM and/or ERM sending a session key to the untrusted device, the cryptographic functionality may be performed within a local XRM.

For example, Untrusted Device 854 may send data to be encrypted to XRM 852, which may encrypt the data and return is the encrypted data to Untrusted Device 854. The data to be encrypted may be sent to XRM 852 using some type of local encryption such that a local eavesdropper is unable to monitor the communications between Untrusted Device 854 and XRM 852. The local communications may be encrypted using a different key than is used for communications with the communication peer. For the additional levels of security, a local XRM may provide security feedback (e.g., a secure display) to the user of Untrusted Device 854. By performing encryption and/or decryption at XRM 852, the secret keys used to perform the cryptographic functions may be kept within the boundaries of the trusted, secure hardware components (e.g., XRM). By keeping the sensitive cryptographic keys outside the untrusted device, an additional level of security may be achieved, increasing the overall trustworthiness of the PTE.

For example, if XRM 852 will perform the encryption/decryption during a secure communication session, then at 862 Untrusted Device 854 may send data to XRM 852 for encryption. At 864 XRM 852 may encrypt the data, for example using a cryptographic key associated with a user of Untrusted Device 854. In an example, the key used for encrypting communications to Communication Peer 856 may not be shared with Untrusted Device 854. At 866 XRM 852 may send the encrypted data to Communication Peer 856. In an example, XRM 852 may send the encrypted data directly to Communication Peer 856 and/or may first forward the encrypted data to Untrusted Device 854, which may then send it to Communication Peer 856.

If Untrusted Device 854 receives a message from Communication Peer 856 that includes encrypted data (e.g., at 868), then Untrusted Device 854 may send the encrypted data to XRM 852 for decryption. At 870 XRM 852 may decrypt the data using the secret (e.g., session) key. At 872, XRM 852 may send the decrypted data to untrusted Device 854. During the secure call, XRM 852 may periodically test or check in on Untrusted Device 854. For example, XRM 852 may perform one or more of the interactive monitoring features and/or active security features described herein to ensure that Untrusted Device 854 is acting in accordance with the predetermined security policies for the secure call and/or for the PTE. If Untrusted Device 854 passes the test(s), the call may continue, but if a test is failed or no response is received within a predetermined time period, the secure call may be terminated and/or the user may be alerted to the failure and given a choice whether or not the secure call should be terminated. At 874, the secure call may be terminated, for example in a manner similar to 838-840 of FIG. 8A.

Figure 9:
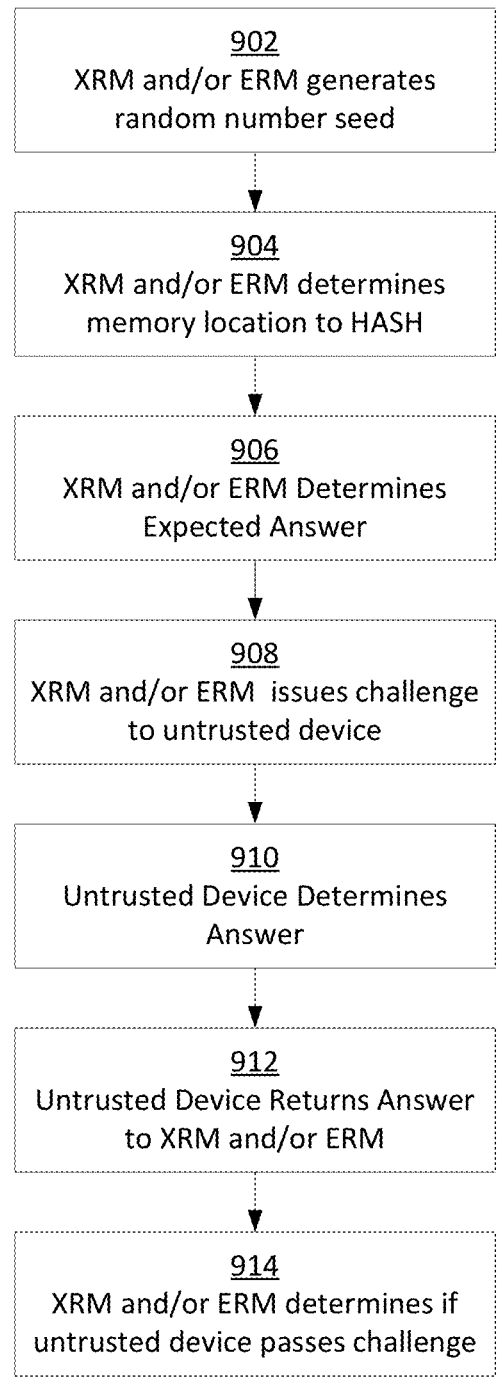
FIG. 9 illustrates an example method for an XRM and/or ERM to challenge an untrusted device.

FIG. 9 is a flow chart for an example process where an XRM and/or ERM may validate that an untrusted device is operating according to predefined security parameters or policies. For example, an XRM and/or ERM may issue a challenge to the untrusted device. The challenge may include a request to hash the program/application charged with storing the binary data in the untrusted device and/or binary data stored in the untrusted device. The hash may be "seeded" with a random number that may be provided by the XRM and/or ERM as part of the challenge. The seeded hash function may then be applied to the program/application image operating in the untrusted device and/or binary data stored in the untrusted device. By seeding the hash function with the random number, it may be extremely difficult—if not practically impossible—to spoof the hash test challenge with a pre-computed answer. This is the case because in hash operations the order of the operation affects the answer, so an answer may not be computed until the XRM and/or ERM provides the untrusted device with the random number. Without the random seed, an attacker may be able to pre-compute the answer before the challenge is even issued. However, with the use of the random number seed there may be nearly an unlimited number of challenges and/or answers that be used to validate the memory image of the untrusted device.

For example, as illustrated in FIG. 9, at 902 the XRM and/or ERM may generate a random number. The random number may be used as seed for the hashing challenge. At 904 the XRM and/or ERM may determine the memory range in the untrusted device that is to be used for the challenge. For example, the memory range may correspond to the memory used by the program that stores and/or access binary data stored on the untrusted device (e.g., assembly code). The memory region may be associated with code that provides access to system resources, such as memory, processor(s), I/O devices, displays, etc. (e.g., system kernel). In an example, the memory location may correspond to binary data stored on the untrusted device. In an example, the memory location may include multiple regions within the memory of the untrusted device. At 906 the XRM and/or ERM may determine an expected answer to the challenge. For example, the XRM and/or ERM may know what the expected binary data in the memory location that is being validated is supposed to contain. The XRM and/or ERM may hash the random number followed by the known/expected binary data for the memory region to be validated. The result may be the answer that the XRM and/or ERM expects to receive from the untrusted device if the device is operating in accordance with the expected security policies and procedures.

At 908 the XRM and/or ERM may issue the challenge to the untrusted device. For example, the XRM and/or ERM may send the random number and an indication of a memory location to be used for the challenge to the untrusted device. The indication of the memory location may include one or more of a starting memory address, a stopping memory address, a length of the memory region to be hashed, and/or the like. If multiple memory regions are to be included as part of the challenge, the challenge request may include multiple starting memory addresses, ending memory addresses, lengths of the memory region, etc.

At 910, the untrusted device may hash the random number seed concatenated with the binary data located at the indicated memory regions (e.g., has the random number seed with the binary data that corresponds to the specified memory region). Such a process may include hashing the seed with a first portion of the memory region, and then hashing the result with the next portion of the memory region, and so on until the entire memory region has been applied in the hashing function. The result may be the determined challenge answer. At 912 the untrusted device may send the determined answer to the XRM and/or ERM for validation. At 914 the XRM and/or ERM may compare the result returned by the untrusted device to the expected answer that was determined at 906. If the XRM and/or ERM determines that the results are as expected (e.g., the expected result matches the returned result), then the XRM and/or ERM may determine that the untrusted device has passed the challenge. If the XRM and/or ERM determines that the results are not as expected (e.g., the expected result does not match the returned result), then the XRM and/or ERM may determine that the untrusted device has failed the challenge. The XRM and/or ERM may take appropriate actions if the test is passed (e.g., continue secure operation, indicate secure status and/or that the test was passed to the user, etc.) or failed (e.g., terminate secure operation, end a secure call, log the failure in order to provide an indication of the failure to a PTE operator, lock down the untrusted device, clear the memory of the untrusted device, indicate that the untrusted device is currently unsecure to the user, indicate that the unsecure device has failed the challenge to the user, etc.).

An XRM and/or ERM may provide security services to an untrusted device. The security services may include interactive monitoring services and/or active security services. Examples of security service that may be provided by an XRM and/or ERM may include one or more of performing KATs to an untrusted device, providing challenge/response messaging to an untrusted device, sequence monitoring of an untrusted device, operating a watchdog timer for an untrusted device, determining and/or verifying application/data checksums, random number generation, performing key exchange, performing key agreement, storing security keys, providing a trusted display of peer user credentials, authenticating the passwords of local users, performing biometric authentication of a local user, providing key management infrastructure (KMI) support, and/or other security functions in any combination. Such functions may be performed by the XRM and/or ERM in conjunction with untrusted device in order to provide an additional layer of security for the untrusted device. The additional layer of security may be provided by trusted hardware in the XRM and/or ERM verifying processing and/or data associated with the untrusted device. In an example, for certain applications such as Type 1 communications, a local XRM may be used to perform one or more of the functions such as performing key exchange, performing key agreement, storing security keys, providing a trusted display of peer user credentials, authenticating the passwords of local users, performing biometric authentication of a local user, providing KMI support, and/or the like.

An example of a security function that may be provided by an XRM and/or ERM may be performing KATs. For example, and XRM and/or ERM may perform a KAT to determine if untrusted device is executing software in accordance with a desired security level. As an example, a KAT may be used to determine if an encryption (and/or description) process being performed by an untrusted device is being performed correctly. A KAT may include performing the cryptographic process on a block of data for which the correct (e.g., encrypted) output is already known.

For example, the XRM and/or ERM may send data bits to untrusted device for encryption by the untrusted device. The untrusted device may then encrypt the data bits using the current encryption parameters and send back the result to the XRM and/or ERM. The XRM and/or ERM may compare the output determined by the untrusted device with the known answer. For example, the XRM and/or ERM may independently determine the answer using the same cryptographic procedure as the one that is supposed to be used on untrusted device when the untrusted device is operating in a secure state. If the output supplied by the untrusted device does not match the known answer (e.g., the answer determined by the XRM/ERM), then the untrusted device may fail the KAT. Based on the failed KAT, the XRM and/or ERM may determine that the untrusted device is operating insecurely, and may indicate the unsecure status to the user of the untrusted device. For example, an XRM may display an indication that the untrusted device has failed the KAT and/or the ERM may send a message to the untrusted device indicating that the KAT has failed. The untrusted device may display an indication that the KAT has failed and/or that the untrusted device is operating in an unsecure state.

In an example, the XRM and/or ERM may use one or more of a variable key KAT, a variable text KAT, an intermediate value KAT, and/or a tables KAT. The XRM and/or ERM may continuously perform the KATs, may perform KATs periodically, and/or may perform a KAT based on trigger. For example, an unexpected action by the untrusted device may trigger the XRM and/or ERM to perform a KAT and/or determine a security status for three untrusted device.

In an example, an XRM may be configured to perform strong authentication for an untrusted device. For example, the XRM may also provide authentication of a user or device in communication with the untrusted device. Authentication may include confirming the authenticity of an attribute of a datum or entity. For example, authentication may include confirming the identity of a person, tracing the origins of data, ensuring that a communication is what it claims to be, and/or assuring that a computer program is a trusted program. Authentication techniques that utilize a Private Key Infrastructure (PKI) may associate the Private Key of the user with the Digital Identity (Digital ID) of the user. Hence, in essence protecting the Private Key for the user may protect the identity of the user from being compromised (e.g., as long as the Private Key has been kept a secret, the user cannot be impersonated). In many common applications, a trusted third party may be used to generate and distribute a Private Key to a user, and the Private Key may then be used at a later time for authentication of the user. However, the security model for the Private Key in this scenario may be inherently flawed since the key itself may be stored by both the user and the third party. Additionally, the key may be compromised during distribution from the third party to the user if a non-secure distribution channel is traversed when the key is communicated to the user. In an example, an ERM may be configured to perform the authentication.

If an XRM token is utilized, trusted Private Key generation within the XRM may be performed to protect the key from being compromised. For example, the XRM may generate a private key to be used to authenticate the user of the untrusted device with a communication peer and/or to authenticate the communication peer to the user of the untrusted device. The Private Key may be stored within the XRM and the XRM may refrain from communicating the content of the Private Key to the untrusted device. In an example, the XRM may be pre-loaded with the Private Key to ensure that content of the Private Key is not compromised when it is loaded onto the XRM.

In an example, the XRM and/or ERM may use public-key authentication to authenticate a communicating peer, an untrusted device, a party to a transaction, and/or a user of an untrusted device. For certain applications, additional levels of trust may be obtained if the authentication is performed by the XRM rather than an ERM, however, embodiments contemplate performing authentication using either or both of the reference monitors. Public key authentication may rely on the assumption that a user who wishes to be authenticated has access to a secret, private key. The private key may be stored in the XRM and/or ERM and may be refrained from being shared with the untrusted device. For example, a communicating peer may select a random number and may send the random number to the untrusted device, the XRM, and/or the ERM. The XRM and/or ERM may send a second random number back to the communicating peer (e.g., via the untrusted device), for example based on the first random number. The communicating peer may then compute a new value using the private key that may be based on the second random number. The computed value may be sent back XRM and/or ERM (e.g., via an untrusted device) where the XRM and/or ERM may use to the public key verify that the value computed by the communicating peer was computed using the private key. If so, then the XRM and/or ERM may determine the communicating peer has access to the private key of the claimed identity and thus may be trusted. In an example, XRM and/or ERM may use one or more of zero-knowledge proofs, digital signatures, and/or other authentication techniques.

An example authentication method may include using passwords. For example, the communication peer may communicate a password to the untrusted device. The untrusted device may provide the password to XRM and/or ERM for evaluation. An example authentication method may include a password with a digest. For example, the communication peer may provide a password and additional information (e.g., a digest) such as a hash of client IP address, a time stamp, and/or other information. The XRM and/or ERM may use the digest to ensure that no other entities with different identifying information, such as a different IP address, attempt to use the password.

An example authentication method may include using one-time passwords. A one-time password may be similar to a challenge/response test. For example, the communication peer may provide an identification to the untrusted device, to the XRM, and/or to the ERM. The XRM and/or ERM may respond with a challenge value after receiving the identification. The communication peer may determine a response to the challenge based on the type of challenge and/or the provided identification. If the response of the communication peer matches the expected response, the XRM and/or ERM may authenticate the communication peer to the untrusted device. In an example, a local XRM may indicate that the communication peer has been authenticated to the user of the untrusted device, for example via a secure display. The ERM may send an indication of the authentication to the user of the untrusted device.

In an example, the XRM and/or ERM may be used to authenticate the local user of the untrusted device. For example, one or more or any combination of the authentication techniques described with respect to authenticating a communication peer may also be employed to authenticate the user of the untrusted device. For example, the XRM and/or ERM may use a password to determine if a local user is authorized to operate the untrusted device in a secure manner. The user may enter the password via the untrusted device, which may communicate the password to the XRM and/or ERM, or the user may enter the password directly via a local XRM (e.g., via a keyboard, touch screen display, or any other input/output device). In an example, the XRM and/or ERM may authenticate a local user using a type of biometric authentication. For example, a DNA sample, an iris scan, a fingerprint sample, and/or any other biologically identifying material may be used to authenticate the local user. If an ERM is to be used, the biometric information may be obtained by the untrusted device and sent to the ERM. If a local XRM is to be used, the biometric information may be obtained directly by the XRM (e.g., for a higher level of assurance) or the untrusted device may provide the biometric information to the XRM. Upon authenticating the local user, the XRM and/or ERM may allow the untrusted device to operate in a secure state.

When a user of the untrusted device wants to authenticate with a communication peer, the untrusted device may route authentication communications from the communication peer to the XRM and/or ERM. For example, the untrusted device may receive an authentication request for the user of the untrusted device (e.g., which may include a random number and/or some other challenge) and may forward the authentication request to the XRM and/or ERM. The XRM and/or ERM may then determine the appropriate authentication response based on the Private Key. The authentication response may then be sent to the untrusted device, which may then forward the authentication response to the communication peer. Hence, authentication of the user of the untrusted device to the user of communication peer may be achieved without communicating the content of the Private Key to the untrusted device.

Additionally, any communications meant to authenticate the user of the communication peer to the user of the untrusted device (e.g., a response to an authentication challenge) may be forwarded from the untrusted device to the XRM and/or ERM for examination. If the XRM and/or ERM determines that the communication peer has been successfully authenticated (e.g., using the Private Key and knowledge of a challenge input provided to the communication peer, for example a random number), a local XRM may display an indication of the successful authentication of the communication peer to the user of the untrusted device and/or the ERM may send a message to the untrusted device indicating that authentication was successful. In an example, an ERM may be used store the Private Key on behalf of the user of untrusted device (e.g., rather than or in addition to the XRM), and the results of the authentication procedure may be sent to the untrusted device for display to the user and/or to an XRM utilized by the user.

The XRM and/or ERM may act as public and/or private key storage for an untrusted device and/or may provide Key Management Infrastructure (KMI) support for an untrusted device. For certain applications such as Type 1 communications, a local XRM may be used; however, for other applications that may entail a lower level of security, and XRM and/or ERM may be used. In order to protect Digital Identity of the user of the untrusted device, a Private Key may be stored and used within a tamper proof boundary. By preventing the Private Key from exiting the tamper proof boundary, the integrity of the Private Key may be maintained. An XRM token and/or an ERM may provide the tamper boundary for key generation, storage, and/or usage in support of Strong Authentication capabilities. The Private Key may be generated inside the tamper boundary (e.g., XRM and/or ERM) and may be refrained from being exposed outside the boundary. As an example, an XRM token may be include a tamper proof casing that prevents unauthorized access to the Private Key(s) stored in the XRM. If the XRM tamper proof casing is compromised, the XRM may delete the Private Key(s), the XRM may display an indication that the Private Key has been compromised/the tamper proof case has been compromised, and/or may send an indication that the Private Key has been compromised/the tamper proof case has been compromised to the untrusted device and/or to a PTE manager or other central authority via the untrusted device. Similarly, if an ERM is used for key storage, if a key has been compromised, the ERM may send an indication of the compromise to the untrusted device for display to the user.

In an example, an XRM and/or ERM may be a random data generator and/or random number source for an untrusted device. For example, some cryptographic techniques (e.g., key generation) and/or authentication methods (e.g., challenge support) may utilize random numbers during processing. An XRM and/or ERM may be configured to act as a random number source for the untrusted device in order to facilitate cryptography and/or authentication at the untrusted device. For example, random data may be used in the generation of a Private Key and/or in the generation of random components during Session Key creation. The XRM and/or ERM may include a true random number generator (e.g., that utilizes a randomness from a physical observation such as a minimally radioactive source or atmospheric noise), a pseudo-random number generator (e.g., algorithms that use mathematical formulae or predetermined tables to produce sequences of numbers that appear random), and/or some combination thereof (e.g., a true random source with randomness amplification) in order to provide random numbers to the untrusted device. The ERM and/or XRM may then communicate the random numbers that are generated to the untrusted device.

The XRM may be used to audit itself and/or the untrusted device. An ERM may also be used to audit the XRM. For example, an XRM and/or ERM may be configured to execute secure code that audits its own actions and/or statistics in accordance with the desired level of security for the device. The XRM and/or ERM may also be in communication with the untrusted device in order to record usage, generate statistics, record challenge-response results (e.g., KATs), and/or otherwise store other useful information that may be used to provide real-time and/or after-the-fact analysis of the characteristics and operation of the untrusted device. For example, the XRM/ERM security layer may facilitate a secure centralized audit and forensics system design, where the audit data recorded by the XRM/ERM may be sent to a central authority for monitoring untrusted device activity. For example, an ERM may act as the central authority that monitors the untrusted device and/or XRM activity.

In an example, an XRM and/or ERM may act as a trusted output for the untrusted device. For example, a user of the untrusted device may rely on a visual, physical, and/or signal-based output of the XRM and/or ERM in order to make a determination of health and security of the untrusted device. For example, an output of a local XRM may be used to display a security status of the untrusted device on a trusted display. An XRM token may be a trusted device that is separate from the untrusted device and may be capable of providing the user with a trusted output. The trusted output in the XRM may be less vulnerable to the common spoofing attacks that may occur in an untrusted device environment. Hence, since the XRM may be a trusted piece of hardware, the output or display of the XRM may be associated with additional levels of security than the output of the untrusted device. Similarly, messages received from an ERM may be associated with an additional layer of security than messages received from other, untrusted sources. The messages received from the ERM may be displayed on the untrusted device or may be routed to the XRM for processing and display, which may provide additional layers of security as opposed to displaying the messages directly on the untrusted device.

An XRM and/or ERM may act as a trusted input for the untrusted device. For example, a local XRM may provide a trusted input for the untrusted device to the user of the untrusted device. Using a trusted input, the user of the untrusted device may authenticate with the XRM Token. For example, a personal identification number (PIN) entry, a password entry, and/or a biometric input may be used to authenticate the user of the untrusted device with the XRM. In an example, the XRM may include a touch screen keypad, NFC communication capability, and/or some type of biometric capability for user input. The input may be used to identify the user, for example based on a previously stored value of the password or biometric data stored on the XRM. Once the user of the untrusted device has been authenticated to the XRM, the XRM may perform the security functions for the user in conjunction with the untrusted device. The specific mechanism used to authenticate the user to the XRM may vary, but the overall capability may be to provide an input that is both trusted and separate from the untrusted device.

In an example, although somewhat less secure than using a physically separated, trusted input of the XRM for accepting inputs from the user, the physical hardware (e.g., keyboard, touchscreen display, microphone, sensors, etc.) of the untrusted device may be used by the user to provide inputs when communicating with the ERM. This approach may still provide an additional layer of security above using the untrusted device alone, as the inputs by the user may still be analyzed by the ERM after they are received from the untrusted device. However, using the inputs of the untrusted device as an input to for the ERM may still be subject to common data and key logging attacks, so the use of a separate, trusted hardware input in a local XRM token may provide higher levels of assurance.

An XRM and/or ERM may perform system health monitoring of the untrusted device. For example, system health monitoring may refer to monitoring any functions performed by the untrusted device, tasks performed by the untrusted device, applications executed on the untrusted device, data stored on the untrusted device, accounts instantiated on the untrusted device, messages received by the untrusted device, messages sent from the untrusted device, and/or the like. Example system health monitoring functions may include sequence monitoring, self-testing, hashing of memory, signing of data, encryption, decryption, memory management unit (MMU) access checking, operating a watchdog timer, determining or verifying application checksums/hashes/CRCs, determining or verifying data checksums/hashes/CRCs, key exchange, key agreement, signature addition, signature verification, and/or the like.

System health monitoring may be used to provide the user of the untrusted device with an indication of the trust level of the untrusted device in real time. The trust level of the XRM/ERM itself and/or for the untrusted device may be provided. In an example, the XRM token and/or the ERM may be configured to issue challenges to the untrusted device and may make a determination regarding the security status of the untrusted device based on the response. For example, the untrusted device may be configured to "check-in" with the XRM and/or ERM intermittently and/or when the untrusted device performs certain functions. The check-in may be as simple as a heartbeat signal or may include the results of processing performed at the untrusted device. A missed check-in from the untrusted device, unexpected responses or heartbeats from the untrusted device, and/or incorrect responses from the untrusted device may cause the XRM and/or ERM to determine that the untrusted device is in an untrusted state. The XRM may then display a negative trust status and/or the ERM may send a message indicating that the untrusted device is in an untrusted state.

In an example, an XRM token itself may be configured to check-in with a centralized XRM authority, indicating the status of the XRM to the authority. For example, the XRM authority may be the ERM. Since the XRM Token may be configured to monitor its own health, for example through self-testing and/or other similar Type-1 mechanisms, the XRM Token may display its own health status to the user of the untrusted device. The system health monitoring of untrusted COTS devices by the XRM and/or ERM and/or the monitoring of XRMs by a centralized authority (e.g., ERM) may provide an additional layer of security for the untrusted device security environment.

The XRM and/or ERM may be configured to communicate with one or more applications running on the untrusted device. For example, the XRM and/or ERM may perform security services for the untrusted device. The result of the security services processing may be an indication of health for the XRM Token itself and/or an indication of the status of the crypto libraries running on the untrusted device. For example, encryption/decryption may be performed by the untrusted device. The encryption/decryption may be performed by an application running on the untrusted device and/or based on instructions included in the operating system kernel for the untrusted device. The XRM and/or ERM may be configured to interrogate the untrusted device, for example to hash data to ensure the crypto libraries (e.g., in an application or the kernel) are configured as expected. In another example, the XRM and/or ERM may be configured to encrypt a piece of known answer data and/or perform challenge-response KAT to determine if an application on the untrusted device is operating correctly.

In order to provide a deeper sense of the status of the untrusted device, the XRM and/or ERM may be configured to be in communication with Operating System (OS) Layers below the application layer. For example, the XRM and/or ERM may be configured to detect rootkits in the untrusted device, so the XRM and/or ERM may execute at OS layers in the kernel and/or below the kernel, for example in a hypervisor. Examples of such interactions may be described with respect to the Android OS for mobile devices, although the systems and methods described herein may be equally applicable to other OSs.

Table 1 illustrates example XRM and/or ERM security service functions that the XRM and/or ERM may perform in order to determine a security status for the untrusted device.

TABLE 1

| Example Crypto Security Mechanisms | Help control\avoid the following: |
|---|---|
| Sequence Monitoring | May avoid malicious modification of the algorithms. |
|  | May avoid transient and error events. |
| Self-Test (KAT) for algorithms | May avoid malicious modification of the kernel, OS, applications, data, etc. |
|  | May avoid transient and error events. |
| Hashing of Memory (e.g., programs and/or data) | May avoid malicious modification of the kernel, OS, applications, data, etc. |
|  | May avoid transient and error events. |
| Signing Data | May avoid malicious modification of the kernel, OS, applications, data, etc. |
|  | May avoid transient and error events. |
| Encryption/Decryption | May avoid malicious modification of the kernel, OS, applications, data, etc. |
|  | May avoid transient and error events. |
| MMU Access checking | May protect against unauthorized memory access. May ensure operation within known memory bounds. |
| Watchdog Timer | May prevent system from becoming hung or executing wildly. |
| Application and Data Checksums/hashes/CRCs | May ensure integrity of data or program that is received or sent. |
| Key Exchange/Key Agreement | May ensure maintenance of unpredictable one time session key |
| Signature | May ensure authenticity of data or program that is received or sent |

The security service capabilities of the XRM and/or ERM may be utilized to interrogate the XRM and/or ERM themselves and/or for the purpose of health and status monitoring of the untrusted device. Additionally the XRM and/or ERM may be configured to provide services to the untrusted device such as key exchange/key agreement management and/or signature handling. Hence, the XRM and/or ERM may be both an active and passive participant in the overall system security model. For example, the XRM and/or ERM may be an active participant in the setup of a secure connection. In order for a secure connection to be setup between the untrusted device and a peer device, the XRM and/or ERM may be used for key agreement negotiation. Additionally, in order for a user to initiate that secure connection, the user may first authenticate to the XRM and/or ERM.

Moreover, once the secure connection has been established, the XRM and/or ERM may provide interactive monitoring, for example by performing sequence monitoring of processing performed at the untrusted device or acting as an MMU. As an external health monitoring device, the XRM and/or ERM may provide an indication of the security/health and/or status of the system (e.g., status of XRM/ERM and/or status of the untrusted device) for the user while the user is engaged in a secure connection. The user may then choose to actively continue or terminate the connection, given their risk profile for their given situation and the indications received from the XRM and/or ERM.

The XRM and/or ERM may provide security function(s) that may be difficult to achieve securely in an untrusted device. For example, XRM may act as a memory management unit (MMU) for an untrusted device. An MMU may be a component responsible for handling access to memory requested by a processor. For example, if the processor or an untrusted device requests one or more bits of data stored in memory, the request may be forwarded to the XRM and/or ERM. The XRM and/or ERM may be configured to monitor the memory call by processor of the untrusted device and/or may provide security functionality to ensure proper operation. For example, XRM and/or ERM may provide one or more functions such as virtual address to physical address translation (e.g., virtual memory management), memory protection, cache control, bus arbitration, bank switching, and/or the like for the untrusted device. In an example, the XRM and/or ERM may monitor operations between the processor of the untrusted device and the memory of the untrusted device, but may refrain from providing actual security functionality. For example, the XRM and/or ERM may determine a security status of the untrusted device based on the monitoring of the untrusted device and/or determining if actions performed by the untrusted device conform to expected operation according to a known security protocol. A local XRM may provide the security status to the user in the form of an audio and/or visual representation and/or the ERM may send a message to the untrusted device to indicate the determined status to the user. The ERM may also send such a message to a local XRM or other local user device for display to the user.

In an example, XRM and/or ERM may perform a cyclic redundancy check (CRC) on data generated and/or managed by the untrusted device. The CRC may be used as part of the interactive monitoring of the untrusted device. For example, the XRM and/or ERM may be configured to utilize a CRC to detect changes to computer data stored on and/or communicated to/from the untrusted device. As an example, blocks of data (e.g., bits) entering, exiting and/or stored on the untrusted device may include a short "check value" attached to the data. The check value may be derived from the remainder of a polynomial division operation on the contents of the data block. When the data is retrieved the calculation may repeated, and corrective action may be taken against presumed data corruption, for example if the check values do not match. As an example, the XRM and/or ERM may attach CRC bits to data stored on the untrusted device. The XRM and/or ERM may periodically or intermittently re-compute the CRC bits based on the data. If the CRC bits do not match, the XRM and/or ERM may determine that the data has been modified and indicate such to the user. The XRM and/or ERM may determine a security status of the untrusted device based on one or more CRC checks performed on data stored on the untrusted device and/or data communicated to/from the untrusted device. In an example, the XRM and/or ERM may provide application, data, and/or communication message checksums to ensure proper operation by the untrusted device.

In an example, an XRM and/or ERM may perform data label checks and/or sequence monitoring for the untrusted device. For example, the XRM and/or ERM may monitor communications, packets, headers, signals, and other data communicated to or from the untrusted device in order to determine if the communication and/or data is in accordance with an expected pattern or value. For example, the XRM and/or ERM may monitor the destination (e.g., address) of out-going and/or in-going communications for the untrusted device. The XRM and/or ERM may perform sequence monitoring of functions or steps performed by the processor of the untrusted device. For example, during an encryption (and/or decryption) process, the XRM and/or ERM may request that processor of the untrusted device indicate the current processing step that it is performing in the encryption process. The processor of the untrusted device may inform the XRM and/or ERM of the current processing step. The XRM and/or ERM may then monitor subsequent processing steps performed by the untrusted processor to ensure that the subsequent steps are in accordance with a known encryption (and/or decryption) procedure. The XRM and/or ERM may determine a security status of the untrusted device based on the result of the communication monitoring and/or the sequence monitoring. For example, if the processor of the untrusted device performs a step that is not in accordance with the expected/known procedure, the XRM and/or ERM may determine that untrusted device is unsecure. The XRM and/or ERM may indicate the unsecure status to the user or send a message to the untrusted device or some other user device or network monitor indicating the unsecure status.

In an example, the XRM and/or ERM may include a watchdog timer. A watchdog timer may trigger a system reset or other corrective action if the untrusted device fails to regularly respond to the XRM and/or ERM. For example, at a given point in time the XRM and/or ERM may start the watchdog timer. The XRM and/or ERM may inform the untrusted device that it has started the watchdog timer and may inform the untrusted device of a time associated with the start of the watchdog timer and/or the length of the watchdog timer. The watchdog timer may be associated with a certain process being performed by the untrusted device (e.g., a cryptographic function). The length of the watchdog timer may be determined based on the associated function being performed by the untrusted device.

If the untrusted device fails to service the watchdog timer in the XRM and/or ERM prior to the expiration of the watchdog timer (e.g., by sending a "service pulse" or other message to the XRM and/or ERM), the XRM and/or ERM may determine that the untrusted device 100 is operating in an insecure manner and may indicate the unsecure status of untrusted device to the user. The service pulse may act as a reset for the watchdog timer. In an example, the watchdog timer may place an upper bound on the processing time available for certain security functions being performed by untrusted processor. By doing so, the XRM and/or ERM may provide a defense and potentially prevent some types of denial-of-service attack and/or prevent the untrusted device 100 from performing additional, non-authorized functions during a procedure which involves the untrusted device operating in a secure mode. In an example, the watchdog timer may trigger failsafe control systems to move into a safety state, such as turning off transceivers, preventing further communications, and/or ending a secure session (e.g., a secure voice call) upon expiration of the timer. In an example, the watchdog timer may be in continuous operation, and if the untrusted device does not periodically service the watchdog timer, the XRM and/or ERM may determine that untrusted device is operating in an unsecure status and indicate as such to the user.

In order to properly monitor operation of the untrusted device, the XRM and/or ERM may communicate with multiple OS layers within the untrusted device. For example, different types of attacks and exploits may compromise different layers of the OS of the untrusted device. As such, the XRM and/or ERM may be configured to monitor different layers of the OS in order to prevent different types of attacks. Although the following examples may be described in terms of protecting the Android OS against attacks, the systems and methods described may be equally applicable to other OSs.

Table 2 illustrate example threats that the XRM and/or ERM may be configured to detect and/or identify in the untrusted device.

TABLE 2

| Platform Independent Threats | Description |
| --- | --- |
| Root Kit | A rootkit may be used to gain Root Access to the kernel or Operating System. Rootkits may install a hypervisor below an OS and/or exploit hardware specific features. |
| Managed Code Rootkit | May be a rootkit attack on the runtime Virtual Machine (VM). The managed code rootkit may be an attack on the "sandbox" itself. Applications that run in the VM may be no safer than the underlying VM. |
| Underlying Hypervisor or Emulator (alternate domain Covert Channels) | An Emulator or lowest-level hypervisor may be used to shim the untouched Operating System making it appear that the OS is untouched and in working order while running malicious code, another OS, or other capabilities below or "next to" the untouched OS. The attack may be considered a covert channel in a different OS Space than the security service app. |
| Same domain Covert Channels | A covert channel in the same OS space as the security services application may leak sensitive material (e.g., voice and data) without interfering with the security services application. |
| Denial of Service | Critical resources for communicating voice and data from the COTS device to the network may be unavailable or over-utilized as a way of denying service to the security services application. Battery draining techniques may be utilized by attacks to disable the device. |
| Malfunctioning security services application | Non-malicious actions may result in failure of the security services application, for example bit flips in certain section(s) of code. |

TABLE 2-continued

| Platform Independent Threats | Description |
| --- | --- |
| Malicious Modification to security services application | Malicious actions, either active threats like hacking or accidental download of malware-virus-Trojan features in apps, that may purposely attempt to modify or manipulate the security services application. |
| Private Key Storage on device | Successful hacks to gain access to the user's Private Key (e.g., Used in Certificate Processing) put the user's digital identity at risk of impersonation. |

The XRM and/or ERM may be configured to prevent or detect such attacks, for example using interactive monitoring of the untrusted device (e.g., sequence monitoring, KATs, challenge/response, MMU functions, etc.) and/or by actively performing certain security functions (e.g., key management, authentication, etc.). Additionally, certain OS layers may be vulnerable to attack. For example, threats may be designed to attack communications between different applications or components. As an example, communication layers between the components within applications and/or across applications that are utilized to communicate with one another may be targeted. For example, many OSs may include a Java Native Interface (JNI) that may enable Java code running in a Java Virtual Machine (JVM) to call, and to be called by, native applications (e.g., programs specific to a hardware and operating system platform) and other libraries in the OS (e.g., written in other languages such as C, C++, assembly, etc. that are used by other applications or tasks). For example, the Android OS may allow application level software to utilize native libraries through a JNI layer. Therefore, the JNI layer may be vulnerable to attack and may be monitored by the XRM and/or ERM.

In another example, OSs that utilize a Linux process (e.g., thread) model for processing and/or communication may allow process threads to communicate with each other over a binding interface that may be referred to as Inter-Process Communication (IPC). For example, an IPC may utilize a set of methods for the exchange of data among multiple threads in one or more processes. IPC methods may include methods for message passing, synchronization, accessing shared memory, remote procedure calls (RPC), and/or the like. The method of IPC used may vary based on the bandwidth and latency of communication between the threads and/or the type of data being communicated. As an example, the Android OS may utilize an IPC layer to allow communication between multiple threads. This interface may be vulnerable to attack and hence may be monitored by the XRM and/or ERM. Table 3 illustrates example threats to IPC that may be detected and/or prevented by the XRM and/or ERM.

TABLE 3

| Example IPC Threats | Description |
| --- | --- |
| Broadcast Theft (Public Broadcast) | An eavesdropper may passively read the contents of a broadcast message. A public broadcast may be implicit and may be difficult to protect using permissions. |
| DOS or data injection attack (Ordered Broadcast) | An eavesdropper may register itself as highest priority, and thus messages may be delivered to the eavesdropper may before reaching its intended destination. The eavesdropper may refrain from forwarding the message and/or may modify the message before forwarding it to the intended destination. |
| Activity hijacking example 1 | An eavesdropper may passively read the data in a message and then forwards message to its intended destination. The eavesdropper may register to receive implicit messages from the source, and the source may send out implicit messages that may be intercepted. |
| Activity hijacking example 2 | An eavesdropper may impersonate a legitimate activity interface to steal data in message (e.g., phishing). For example, a user may select "Donate Here," and a malicious app may intercept the |

TABLE 3-continued

| Example IPC Threats | Description |
| --- | --- |
| | message and deceives the user. In Android, phishing attacks may be relatively easy to perform since the Android user interface may refrain from identifying the currently running application. |
| Activity hijacking example 3 | In some OSs (e.g., Android) a default Activity may be used when messages may be handled by more than one activity. A default activity may be set by the user and so the user may accidentally or purposely set a malicious app as the default activity. |
| Service hijacking - no UI | A malicious service may intercept a message meant for a legitimate service. For example, the calling application may establish a connection with the malicious service after the interception. The malicious service may then steal data and mislead the application into believing that requested actions have been completed. When multiple services can handle a message, some OSs (e.g., Android) may select a service at random, for example without user prompts, leading to impersonation opportunities. |

In an example, exploits may be utilized by an attacker in order to gain root access to the kernel and/or OS. Table 4 outlines some example exploits that may be used by attackers to gain root access to a kernel. Although the examples described with respect to Table 4 may be described in terms of attacks on the Linux, the attacks may also be made against other Oss (e.g., Android, etc.). The example attacks vectors (e.g., exploits) listed in Table 4 may be inherent in one or more distribution versions of Linux. Similar, exploits may also be inherent in distributions of other OSs.

TABLE 4

| Root Kit Name | Data Structures Affected | Mechanism |
| --- | --- | --- |
| 1. Adore-0.42 | System call table | N/A |
| 2. All-root | System call table | N/A |
| 3. Kdb | System call table | N/A |
| 4. Kis-0.9 | System call table | N/A |
| 5. Linspy2 | System call table | N/A |
| 6. Modhide | System call table | .Hides kernel modules |
| 7. Phide | System call table | .Hides processes |
| 8. Rial | System call table | .Hides files, directories, processes, net ports |
| 9. Rkit-1.01 | System call table | Assigns root user id to a process |
| 10. Shtroj2 | System call table | Installs root user backdoor to system |
| 11. Synapsys-0.4 | System call table | Hides files, processes, users, net ports |
| 12. THC Backdoor | System call table | .Changes process id owner |
| 13. Adore-ng | Virtual File System hooks; UDP receive message | Does it all. Package containing a number of attacks on the Linux kernel and how to hide them |
| 14. Knark-2.4.3 | System call table, process file sys hooks | Does it all. Package containing a number of attacks on the Linux kernel and how to hide them |
| 15. Disable Firewall | netfilter hooks | Runs a predetermined command on remote server |
| 16. Disable PRNG | Virtual File System hooks | N/A |
| 17. Altering RTC | Virtual File System hooks | N/A |
| 18. Defeat signature scans | Virtual File System hooks | N/A |
| 19. Entropy pool | struct poolinfo | N/A |
| 20. Hidden processes | Process lists | N/A |
| 21. Linux Binfmt | Shellcode.com | N/A |
| 22. Resource waste | struct zone_struct | N/A |
| 23. Intrinsic DOS | int max_threads | N/A |

In an example, in order for an XRM and/or ERM to monitor the health and/or security status of an untrusted system at levels below the security services application layer, the XRM and/or ERM may be configured to communicate with multiple layers of the untrusted OS architecture. For example, the XRM and/or ERM may be configured to monitor multiple layers of the Linux or Android OS. As an example, the XRM and/or ERM may interface with the application layer of the untrusted device. The XRM and/or ERM may monitor the application layer in order to assist in performing encryption/decryption, support secure voice and/or data calls, and/or otherwise monitor applications running in the OS. In an example, the XRM and/or ERM may interface with a runtime environment and/or virtual machine included in the untrusted OS. For example, the XRM and/or ERM may monitor and/or detect threats to communications between the runtime environment/VM and processes or threads executed by the OS. In an example, the XRM and/or ERM may interface with the kernel. For example, the XRM and/or ERM may be configured to monitor the interface between applications being executed on the untrusted OS and the actual data processing performed at the hardware level (e.g., kernel level monitoring). Hence, the ERM and/or XRM may monitor communications between hardware and software components. In an example, the ERM and/or XRM may interface with a thin client included on a hypervisor and/or with the hypervisor itself. For example, a hypervisor or virtual machine manager (VMM) may be a hardware virtualization technique for interfacing virtualized hardware resources for access by one or more OSs. The XRM and/or ERM may monitor the thin client and/or the hypervisor to detect threats from the untrusted OS.

In a sense, the XRM and/or ERM may provide one or more an additional layers of security to the overall security model for an untrusted device. The additional layers of security may be used in any combination, and not all layers of security may be utilized for certain applications. For example, the amount of additional security that is used may be application specific and factors such as customer expectations and/or sensitivity of the data may ultimately drive the decision of how many additional security features are provided.

Table 5 lists example security layer functionality that may be provided by the XRM and/or ERM. One or more of the security layer candidates identified in Table 5 may be implemented by the XRM and/or ERM systems, for example, based on end-user requirements for data protection and environment expectations. In an example, the functions may be implemented in an XRM and/or ERM that is physically separated from the untrusted device. In an example, rather than or in addition to physically separated XRM/ERM, the untrusted OS may be modified and/or applications may be installed in the untrusted device to implement and/or monitor the security layer functions. The modified OS and/or the application may be in communication with the physically separate XRM/ERM and may communicate information regarding the untrusted device to or from the XRM/ERM. The XRM and/or ERM may command or control the modified OS and/or the security applications.

TABLE 5

| Security Layer Candidate | Brief Description |
| --- | --- |
| Provisioning Officer | The person responsible for provisioning XRM and/or ERM may be vetted through proper channels |
| XRM/ERM and Untrusted Device Provisioning | Both the XRM/ERM and the untrusted device may be provisioned by the Provisioning Officer. Provisioning may refer to who is accountable for the devices, pairing of the devices, installation of images, installation of security policies, etc. |
| Use of a Hypervisor | A Bare Metal Hypervisor may be instantiated to act as the resource manager for multiple Operating System instantiations. |
| Owning the Kernel | The XRM and/or ERM may be configured to own (e.g., have absolute rights) the OS kernel of the untrusted device |
| SELinux kernel as a replacement for Linux kernel | The XRM and/or ERM may implement a Mandatory Access Control (MAC) policy in Linux, for example, instead of the traditional Discretionary Access Control (DAC) policy. Hence, there may be some modification of the untrusted OS to include some XRM/ERM functionality. As an example, the SELinux model may prevent specific Android exploits through its access control policy. |
| Policy for Mission Usage | Very Strict Policy - Under a Mission Usage Policy, the untrusted device may be wiped clean before each mission to help ensure that a known, acceptable image resides on the device. |
| Policy for Approved Apps | Slightly Strict Policy - Users may be allowed download specific apps but may not be allowed to download apps not on the list. For example, a program such as APK Inspector may be used to scan the assets, resources, and certificates contained within the APK to make a security determination for the app. Similar approaches to vetting apps can be taken, resulting in an approved list of apps. |
| Egress Firewall (filtering outgoing data) | May add an additional level of security to purposely spoof requested resources such as Contacts, IP Address, etc. This kind of policy built into a firewall may help stop the unauthorized leakage of personal data. The egress firewall may also address the go/no-go app installation decision that may inhibit users. |
| Kernel level software modifications | Modifications at the kernel of the OS may allow for larger scope access then at the user application level. For example, detection of rootkits through forensic memory analysis and comparison of code to known good image data may be performed at the kernel level. |
| Policy for Remote Administration | Policy may be implemented to provide remote administration for securely wiping phone contents and locating devices. |
| OnBoard Cryptographic Libraries | Encryption/Decryption services may be offered (e.g., as an Android Component Service) to other apps. Encryption/Decryption services may be built into an app itself, such as VoIP apps through an SDK delivery to developers. Another option may be to include Encryption/Decryption services as a kernel library. |
| Offboard Cryptographic Libraries | The XRM/ERM may act as an offboard cryptographic library for the untrusted device. When performing cryptographic functions such as encryption or decryption, the untrusted device may call the libraries stored on the XRM/ERM. Such a scheme may prevent unauthorized modification or copying of the offloaded libraries. |
| Offboard Key Storage/Usage | The XRM/ERM may act as an offboard key store for the untrusted device. When performing cryptographic functions such as encryption or decryption where a key is used, the steps that utilize the secret key may be performed at the XRM/ERM. The XRM/ERM may then return the results to the untrusted device. |
| Hardware Trust Anchor | The XRM/ERM may act as a trust base for a typical buttoned-up, secure tasks. For example, the XRM/ERM may act as a separate piece of hardware where keys may be created, managed, and stored and in which crypto operations may occur. |
| Near Field Communication (NFC) | The XRM and/or ERM may manage NFC communications performed by the untrusted device |
| Mobile Virtual Network Operator (MVNO) | MVNO is a term for Over the Network device management. which for example may include authentication, access control, updates, application loading, and cert updates/revocation. The XRM and/or ERM may act as a MVNO |
| Process Management | The XRM and/or ERM may have the ability to monitor for and shutdown unauthorized processes running in the untrusted OS. |

TABLE 5-continued

| Security Layer Candidate | Brief Description |
| --- | --- |
| Over the Air Rekey (OTAR) | Communication channels between the untrusted device and the XRM/ERM may be used to perform OTAR. OTAR may result in the changing or updating of cryptographic keys over a two way radio system (e.g., between the XRM and the untrusted device). |
| Policy for Rebooting | Certain threats may reside in volatile memory and may be eliminated once the device is rebooted. The XRM and/or ERM may enforce policies such as daily device rebooting to attempt to remove these type of short-lived threats. |
| Custom Rootkit | A custom rootkit may be installed on the untrusted device that may be responsible for presenting all root level requests to the user. The rootkit may be a way to control root access. The XRM and/or ERM may interface with the custom rootkit. |
| Policy for User Authentication (password, biometrics) | Passwords may be a type of security measure, but policy can dictate how robust the password may be. The XRM and/or ERM may enforce policies that - coupled with technologies such a generated keypad with values randomly displayed instead of a static keypad, incorporating biometrics, use of a pin, and/or the like - utilize more than on type of authentication. User Authentication may be on the XRM/ERM to unlock XRM/ERM services, on the untrusted device, and/or on the individual application level. |
| AntiVirus Protection | The XRM and/or ERM may be configured to provide anti-virus protection to the untrusted device. |
| Data Leak Protection (DLP) | The XRM and/or ERM may be configured to detect when data is being copied to or moved from the untrusted device. |
| Custom Virtual Machine (VM) | A JVM or a new VM may be used, for example rather than or in addition to the default Dalvik VM in Android or other VMs that are charged with running applications on the untrusted device. A custom VM may be used to address known attacks in Android Dalvik VM or other VM managers and/or to close generic VM type attack vectors. |

Figure 10:
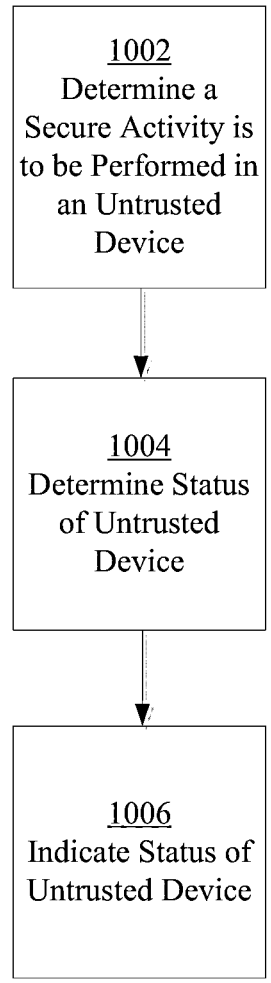
FIG. 10 illustrates an example method for determining the security status of an untrusted device.

FIG. 10 is an example flow diagram for a method for determining a security status of an untrusted device. The method may be implemented in an XRM and/or ERM. At 1002 the XRM and/or ERM may determine that a secure activity is to be performed in an untrusted device. For example, the XRM may receive a request from an untrusted device. For example, a user may desire to establish a secure voice call with a communication peer. At 1004 the XRM and/or ERM may determine the security status of the untrusted device. For example, to establish the secure call, the XRM may authenticate the local user, may authenticate the communicating peer, may ensure the untrusted device is operating according to known procedures, and/or may ensure that the untrusted device is properly securing communications to the communication peer. Based on various factors, the XRM and/or ERM may determine if the status of the untrusted device is secure or unsecure (or any other status based on the desired security functionality). At 1006, the XRM may indicate the determined status of the untrusted device to a user of the untrusted device. The XRM may also store the status and/or may provide the status to some other user monitoring the status of the untrusted device.

In an example, an XRM and/or ERM may communicate continuously with the Smartphone or workstation over Bluetooth, WiFi, NFC, and/or over an IP network. For example, if a phone call is to be secured, the XRM may monitor an untrusted phone before, during, and/or after a call and may indicate a security status that will inform the user whether the untrusted device is operating according to the desired level of security. For the IP-based approach, the XRM may communicate a security status visually or audibly using the untrusted hardware. In an example, a method for providing and enforcing secure operations on an untrusted device and to provide real-time security status indications to the operator using an external trusted hardware platform may be provided.

In an example, the external high-assurance security device (e.g., the XRM and/or ERM) may monitor the operations of a smartphone or client workstation to increase the overall level of assurance for the communication system. For example, the untrusted device may perform many of the security operations such as encryption/decryption, authentication and key agreement, and/or integrity maintenance. The XRM and/or ERM may interact with and monitor the untrusted phone or workstation and may report a security status of the untrusted device to the user in real-time. In an example, the XRM and/or ERM may provide some of the security functions for the untrusted device, for example authentication of a user in a secure call.

The communications between the XRM and/or ERM and the untrusted device may be protected or secured. For example, encryption may be used to protect communications between the XRM and/or ERM and the untrusted device. The key used to secure the communications may be stored in the SCA of the untrusted device. The XRM and/or ERM may be configured to continuously challenge and/or monitor sections of code in the untrusted device that have access to the key used to secure communications between the XRM and/or ERM and the untrusted device.

Embodiments may take the form of a tangible computer-usable or computer-readable medium providing program code for use by or in connection with a computer or any instruction execution system. Examples of a computer-usable or computer-readable medium include tangible computer media such as semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. A processor may be configured to execute instructions stored in memory to perform the various functions described herein.

What is claimed:

1. A method for increasing security of an untrusted device, the method comprising:
    a secure hardware component sending a request to the untrusted device, the request indicating one or more challenges to be performed by a secure application executing on the untrusted device, wherein the request comprises a random number and the one or more challenges comprise hashing the random number with data included in a specified memory region of the untrusted device;
    the secure hardware component determining an expected response to the one or more challenges based on an expected configuration of the untrusted device;
    the secure hardware component receiving a response to the request from the untrusted device;
    the secure hardware component comparing the expected response to the received response to determine if the expected response is equivalent to the received response, wherein the secure hardware component determines that the untrusted device has been compromised on condition that the received response is not equivalent to the expected response; and
    the secure hardware component allowing the untrusted device to perform one or more functions based on determining that the untrusted device has not been compromised, wherein the secure hardware component determines that the untrusted device has not been compromised based on the received response being equivalent to the expected response.

2. The method as in claim 1, wherein the one or more challenges are associated with a time limit for receiving the response from the untrusted device, the method further comprises the secure hardware component determining that the untrusted device has been compromised on condition that the received response is not received within the time limit.

3. A trusted hardware module for providing security for an untrusted device, the trusted hardware module comprising:
    a communication interface configured to communicate with the untrusted device using a local communication protocol; and
    a processor configured to:
        determine one or more challenges to be performed by the untrusted device, wherein the one or more challenges comprise hashing a random number generated by the trusted hardware module with data stored in a given memory region of the untrusted device,
        determine an expected response to the one or more challenges, wherein the expected response is determined based on an expected contents of the given memory region of the untrusted device and the random number,
        send an indication of the one or more challenges to the untrusted device,
        determine a security status of the untrusted device based on a comparison of the expected response and a response received from the untrusted device, wherein the trusted hardware module is configured to determine that the security status of the untrusted device corresponds to an unsecure status on condition that the received response is not equivalent to the expected response, and
        allow the untrusted device to perform one or more functions based on determining that the security status of the untrusted device corresponds to a secure status, wherein the trusted hardware module is configured to determine that the security status of the untrusted device corresponds to a secure status in response to the received response being equivalent to the expected response.

4. The trusted hardware module as in claim 3, wherein the random number corresponds to a seed to be used as an input to a hashing function challenge.

5. The trusted hardware module as in claim 3, wherein the processor is further configured to authenticate one or more of the untrusted device or a user of the untrusted device.

6. The trusted hardware module as in claim 5, wherein the processor is further configured to authenticate a communication peer on behalf of one or more of the untrusted device or the user of the untrusted device.

7. The trusted hardware module as in claim 6, wherein the processor is further configured to:
    receive data to be encrypted from the untrusted device;
    encrypt the data to form encrypted data; and
    send the encrypted data to the communication peer.

8. The trusted hardware module as in claim 7, wherein the processor is configured to send the encrypted data to the communication peer via the untrusted device.

9. The trusted hardware module as in claim 7, wherein the processor is further configured to:
    receive second encrypted data from the communication peer;
    decrypt the second encrypted data to form decrypted data; and
    send the decrypted data to the untrusted device.

10. A method for a communication device to perform a secure call using untrusted hardware, the method comprising:
    receiving a request to perform a secure call;
    authenticating with a trusted hardware component;
    sending an indication of contents of a memory region corresponding to at least a portion of an unsuspended process executing on the communication device to the trusted hardware component, wherein the unsuspended process executing on the communication device corresponds to at least a kernel, the kernel providing an interface between hardware components of the communication device and software components of the communication device; and
    cryptographically communicating with a communication peer using the trusted hardware component.

11. The method as in claim 10, further comprising suspending one or more applications being executed on the communication device during the secure call, wherein suspending one or more applications being executed on the communication device during the secure call comprises suspending execution of an operating system of the communication device above a kernel level.

12. The method as in claim 10, wherein cryptographically communicating with a communication peer using the trusted hardware component comprises:
    receiving a session key from the trusted hardware component after authenticating with the trusted hardware component; and
    performing one or more of encryption or decryption using the session key.

13. The method as in claim 10, further comprising:
    receiving a challenge from the trusted hardware component, the challenge indicating a random number and a memory region;
    hashing the random number with data corresponding to the memory region;

sending an indication of the result of the hash of the random number and the data corresponding to the memory region to the trusted hardware component within a predetermined or specified time period.

14. The method as in claim 10, wherein the secure call is established with a legacy Type 1 device using Secure Communications Interoperability Protocol (SCIP).

15. A secure hardware component comprising:
a secure input configured to receive an input;
a processor configured to:
   determine that the input was received from a trusted source based on authenticating the source of the input using the input,
   perform one or more security tests on an untrusted device that is associated with the source of the input, wherein the one or more security tests use contents of a memory region corresponding to at least a portion of an unsuspended process executing on the untrusted device, wherein the unsuspended process executing on the untrusted device corresponds to a kernel, the kernel providing an interface between hardware components of the untrusted device and software components of the untrusted device, and
   determine a security status of the untrusted device based on a response received from the untrusted device during the one or more security tests; and
a secure output configured to display an indication of the security status.

16. The secure hardware component as in claim 15, wherein the one or more security tests comprise one or more of authentication, encryption, decryption, key storage, key management, or firewall maintenance.

17. The secure hardware component as in claim 15, wherein the processor is configured to perform the one or more secure actions on behalf of the untrusted device on condition that it is determined that the untrusted device is operating in accordance with an expected configuration.

18. The secure hardware component as in claim 15, wherein the input is a password and authenticating the source of the input comprises determining that the password is the correct password for the source of the input.

19. The method as in claim 1, wherein the random number is a seed for hashing the data included in the specified memory region of the untrusted device.

20. The method as in claim 2, wherein the secure hardware component allowing the untrusted device to perform the one or more functions is further conditioned on the received response being received from the untrusted device within the time limit.

21. The trusted hardware module of claim 3, wherein the one or more challenges are associated with a time limit, and the trusted hardware module is configured to determine that the security status of the untrusted device corresponds to the unsecure status based on either:
   the received response not being equivalent to the expected response, or
   the received response not being received with the time limit.

* * * * *